United States Patent
Jones et al.

(10) Patent No.: US 12,422,795 B2
(45) Date of Patent: Sep. 23, 2025

(54) SYSTEMS AND METHODS FOR SUSTAINABILITY PLANNING FOR A BUILDING

(71) Applicant: Tyco Fire & Security GmbH, Neuhausen am Rheinfall (CH)

(72) Inventors: Joseph C. Jones, Milwaukee, WI (US); Nicole Elyse James, Milwaukee, WI (US); Leigh-Golding Desantis, Milwaukee, WI (US); Robbie G. Davis, Milwaukee, WI (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 393 days.

(21) Appl. No.: 17/948,118

(22) Filed: Sep. 19, 2022

(65) Prior Publication Data
US 2023/0085641 A1  Mar. 23, 2023

Related U.S. Application Data

(60) Provisional application No. 63/246,177, filed on Sep. 20, 2021, provisional application No. 63/336,935, filed on Apr. 29, 2022.

(51) Int. Cl.
*G05B 13/04* (2006.01)
(52) U.S. Cl.
CPC .................. *G05B 13/042* (2013.01)
(58) Field of Classification Search
CPC .................................................. G05B 13/042
See application file for complete search history.

(56) References Cited

U.S. PATENT DOCUMENTS

| 5,497,452 A | 3/1996 | Shimizu et al. |
| 7,580,775 B2 | 8/2009 | Kulyk et al. |
| (Continued) | | |

FOREIGN PATENT DOCUMENTS

| CA | 2957726 A1 | 3/2016 |
| CA | 3043996 A1 | 2/2018 |
| (Continued) | | |

OTHER PUBLICATIONS

U.S. Appl. No. 17/537,046, filed Nov. 29, 2021.
(Continued)

*Primary Examiner* — Gary Collins
(74) *Attorney, Agent, or Firm* — Foley & Lardner LLP

(57) ABSTRACT

The present disclosure relates to systems and methods for improving sustainability of a building. The building includes a plurality of pieces of building equipment that control one or more environmental conditions of the building based on operational settings. One building system includes one or more storage devices storing instructions thereon that, when executed by one or more processors, cause the one or more processors to determine, using data that pertains to at least one of the building or the plurality of pieces of building equipment, a plurality of baseline values for a plurality of sustainability parameters associated with the building, receive a user defined sustainability goal for at least a subset of the plurality of sustainability parameters, analyze operating parameters of at least a portion of the plurality of pieces of building equipment to determine one or more changes to the operating parameters predicted to fulfill the user defined sustainability goal, alone or in combination with one or more other changes to the building, provide one or more recommendations to implement the one or more changes to the operating parameters to meet the user defined sustainability goal, receive a command to implement at least (Continued)

one change of the one or more changes to the operating parameters and determine a revised set of operating parameters for at least a first piece of building equipment of the plurality of pieces of building equipment responsive to the command to implement the at least one change to the operating parameters.

20 Claims, 11 Drawing Sheets

(56) References Cited

U.S. PATENT DOCUMENTS

| | | |
|---|---|---|
| 7,894,946 B2 | 2/2011 | Kulyk et al. |
| 8,473,080 B2 | 6/2013 | Seem et al. |
| 8,527,108 B2 | 9/2013 | Kulyk et al. |
| 8,527,109 B2 | 9/2013 | Kulyk et al. |
| 8,918,223 B2 | 12/2014 | Kulyk et al. |
| 9,002,532 B2 | 4/2015 | Asmus |
| 9,110,647 B2 | 8/2015 | Kulyk et al. |
| 9,235,657 B1 | 1/2016 | Wenzel et al. |
| 9,429,923 B2 | 8/2016 | Ward et al. |
| 9,436,179 B1 | 9/2016 | Turney et al. |
| 9,447,985 B2 | 9/2016 | Johnson |
| 9,612,601 B2 | 4/2017 | Beyhaghi et al. |
| 9,696,054 B2 | 7/2017 | Asmus |
| 9,703,339 B2 | 7/2017 | Kulyk et al. |
| 9,778,639 B2 | 10/2017 | Boettcher et al. |
| 9,852,481 B1 | 12/2017 | Turney et al. |
| 9,982,903 B1 | 5/2018 | Ridder et al. |
| 10,007,259 B2 | 6/2018 | Turney et al. |
| 10,088,814 B2 | 10/2018 | Wenzel et al. |
| 10,101,730 B2 | 10/2018 | Wenzel et al. |
| 10,101,731 B2 | 10/2018 | Asmus et al. |
| 10,139,877 B2 | 11/2018 | Kulyk et al. |
| 10,175,681 B2 | 1/2019 | Wenzel et al. |
| 10,190,789 B2 | 1/2019 | Mueller et al. |
| 10,678,227 B2 | 6/2020 | Przybylski et al. |
| 10,718,542 B2 | 7/2020 | Alanqar et al. |
| 10,871,756 B2 | 12/2020 | Johnson et al. |
| 10,884,398 B2 | 1/2021 | Elbsat et al. |
| 10,908,578 B2 | 2/2021 | Johnson et al. |
| 10,921,768 B2 | 2/2021 | Johnson et al. |
| 10,928,784 B2 | 2/2021 | Craig et al. |
| 11,068,821 B2 | 7/2021 | Wenzel et al. |
| 11,156,978 B2 | 10/2021 | Johnson et al. |
| 11,164,126 B2 | 11/2021 | Elbsat et al. |
| 11,182,714 B2 | 11/2021 | Wenzel et al. |
| 11,567,466 B1 | 1/2023 | Galvez et al. |
| 2002/0165671 A1 | 11/2002 | Middya |
| 2010/0318200 A1 | 12/2010 | Foslien et al. |
| 2013/0134962 A1* | 5/2013 | Kamel ............... G01R 21/1333 324/103 R |
| 2014/0236869 A1 | 8/2014 | Fujimaki et al. |
| 2015/0316901 A1 | 11/2015 | Wenzel et al. |
| 2015/0316907 A1 | 11/2015 | Elbsat et al. |
| 2016/0091904 A1 | 3/2016 | Horesh et al. |
| 2016/0103475 A1* | 4/2016 | Lee ................... G05B 19/41885 700/291 |
| 2016/0313751 A1 | 10/2016 | Risbeck et al. |
| 2016/0377306 A1 | 12/2016 | Drees et al. |
| 2017/0003676 A1 | 1/2017 | Yoshida et al. |
| 2017/0031962 A1 | 2/2017 | Turney et al. |
| 2017/0097616 A1 | 4/2017 | Cozad et al. |
| 2017/0102162 A1 | 4/2017 | Drees et al. |
| 2017/0103483 A1 | 4/2017 | Drees et al. |
| 2017/0104336 A1 | 4/2017 | Elbsat et al. |
| 2017/0104342 A1 | 4/2017 | Elbsat et al. |
| 2017/0104343 A1 | 4/2017 | Elbsat et al. |
| 2017/0179716 A1 | 6/2017 | Vitullo et al. |
| 2017/0212488 A1 | 7/2017 | Kummer et al. |
| 2017/0241658 A1 | 8/2017 | Salsbury et al. |
| 2018/0004171 A1 | 1/2018 | Patel et al. |
| 2018/0004172 A1 | 1/2018 | Patel et al. |
| 2018/0004173 A1 | 1/2018 | Patel et al. |
| 2018/0011459 A1 | 1/2018 | Boettcher et al. |
| 2018/0075549 A1 | 3/2018 | Turney et al. |
| 2018/0196456 A1* | 7/2018 | ElBsat ............... G05B 15/02 |
| 2018/0197253 A1 | 7/2018 | Elbsat et al. |
| 2018/0209674 A1 | 7/2018 | Ridder et al. |
| 2018/0209675 A1 | 7/2018 | Ridder |
| 2018/0231967 A1 | 8/2018 | Cohen et al. |
| 2018/0254632 A1 | 9/2018 | Elbsat et al. |
| 2018/0259918 A1 | 9/2018 | Asmus et al. |
| 2018/0285800 A1 | 10/2018 | Wenzel et al. |
| 2018/0306459 A1 | 10/2018 | Turney |
| 2018/0313563 A1 | 11/2018 | Turney et al. |
| 2018/0314220 A1 | 11/2018 | Kumar et al. |
| 2018/0340704 A1 | 11/2018 | Turney et al. |
| 2018/0341255 A1 | 11/2018 | Turney et al. |
| 2018/0356770 A1 | 12/2018 | Elbsat et al. |
| 2018/0356782 A1 | 12/2018 | Elbsat et al. |
| 2018/0357577 A1 | 12/2018 | Elbsat et al. |
| 2018/0372362 A1 | 12/2018 | Turney et al. |
| 2018/0375444 A1 | 12/2018 | Gamroth |
| 2019/0011145 A1 | 1/2019 | Willmott et al. |
| 2019/0020203 A1 | 1/2019 | Lang et al. |
| 2019/0025774 A1 | 1/2019 | Wenzel et al. |
| 2019/0032942 A1 | 1/2019 | Willmott et al. |
| 2019/0032943 A1 | 1/2019 | Willmott et al. |
| 2019/0032944 A1 | 1/2019 | Wenzel et al. |
| 2019/0032945 A1 | 1/2019 | Willmott et al. |
| 2019/0032947 A1 | 1/2019 | Willmott et al. |
| 2019/0032949 A1 | 1/2019 | Willmott et al. |
| 2019/0066236 A1 | 2/2019 | Wenzel |
| 2019/0079473 A1 | 3/2019 | Kumar et al. |
| 2019/0107825 A1 | 4/2019 | Wenzel et al. |
| 2019/0155268 A1 | 5/2019 | Cohen et al. |
| 2019/0163213 A1 | 5/2019 | Ostrye et al. |
| 2019/0163216 A1 | 5/2019 | Ostrye |
| 2019/0213695 A1 | 7/2019 | Elbsat et al. |
| 2019/0219293 A1 | 7/2019 | Wenzel et al. |
| 2019/0235453 A1 | 8/2019 | Turney et al. |
| 2019/0245368 A1 | 8/2019 | Baumgartner et al. |
| 2019/0257544 A1 | 8/2019 | Alanqar et al. |
| 2019/0340709 A1 | 11/2019 | Elbsat et al. |
| 2020/0026249 A1 | 1/2020 | Przybylski et al. |
| 2020/0041158 A1 | 2/2020 | Turney et al. |
| 2020/0132328 A1 | 4/2020 | Boettcher et al. |
| 2020/0149768 A1 | 5/2020 | Turney et al. |
| 2020/0193345 A1 | 6/2020 | Elbsat et al. |
| 2020/0218208 A1 | 7/2020 | Alanqar et al. |
| 2020/0319610 A1 | 10/2020 | Ray et al. |
| 2021/0200169 A1 | 7/2021 | Ploegert et al. |
| 2021/0200807 A1 | 7/2021 | Ploegert et al. |
| 2021/0270490 A1 | 9/2021 | Turney et al. |
| 2021/0356916 A1 | 11/2021 | Wenzel et al. |
| 2021/0365861 A1 | 11/2021 | Elbsat et al. |
| 2022/0011731 A1 | 1/2022 | Risbeck et al. |
| 2022/0042704 A1 | 2/2022 | Drees et al. |
| 2022/0058545 A1 | 2/2022 | Warake et al. |
| 2022/0092500 A1 | 3/2022 | Drees et al. |
| 2022/0137580 A1 | 5/2022 | Burroughs et al. |
| 2022/0186962 A1 | 6/2022 | Turney et al. |
| 2022/0268471 A1 | 8/2022 | Turney et al. |
| 2022/0284519 A1 | 9/2022 | Pancholi et al. |
| 2022/0299230 A1 | 9/2022 | Boettcher et al. |
| 2022/0299963 A1 | 9/2022 | Waghmare et al. |
| 2022/0335547 A1 | 10/2022 | Wenzel |
| 2022/0381471 A1 | 12/2022 | Wenzel et al. |
| 2022/0390137 A1 | 12/2022 | Wenzel et al. |
| 2023/0020417 A1 | 1/2023 | Elbsat et al. |
| 2023/0085641 A1 | 3/2023 | Jones et al. |
| 2023/0152763 A1 | 5/2023 | Davis et al. |
| 2023/0169220 A1 | 6/2023 | Ramanasankaran et al. |
| 2023/0236560 A1 | 7/2023 | Lee et al. |
| 2023/0253787 A1 | 8/2023 | Wenzel et al. |
| 2023/0350387 A1 | 11/2023 | Davis et al. |

FOREIGN PATENT DOCUMENTS

| | | |
|---|---|---|
| EP | 2 237 201 A1 | 10/2010 |
| EP | 2 504 807 A2 | 10/2012 |
| EP | 3 186 687 A4 | 7/2017 |

(56) References Cited

FOREIGN PATENT DOCUMENTS

| EP | 3 497 377 A1 | 6/2019 |
|---|---|---|
| EP | 3 675 003 A1 | 7/2020 |
| WO | WO-2010/129913 A1 | 11/2010 |

OTHER PUBLICATIONS

U.S. Appl. No. 17/710,458, filed Mar. 31, 2022.
Coolinglogic, "CoolingLogic: Up early, saving billions." URL: http://coolinglogic.com/documents/MarketingFlyer_FINAL_HiRes8.5x11.pdf, retrieved from internet Oct. 27, 2022 (1 page).
Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).
Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).
Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).
Johnson Heating and Cooling L.L.C., "Excel Rehabilitation Building Automation," URL: http://cooljohnson.com/Building-Automation-Systems-Michigan/Waterford-Michigan/Building- Automation-System--Excel.html, retrieved from internet Oct. 27, 2022 (2 pages).
Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).
Johnson Heating and Cooling L.L.C., "JLA Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).
Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).
Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).
Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).
Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).
Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).
Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).
Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).
Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).
Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).
Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).
Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).
Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).
Johnson Solid State LLC, "Building Automation GUI," URL: http://cooljohnson.com/Video/Building_Automation/Confidential_Customer_BLD_2/Building_Automation_GUI.mp4, retrieved from internet Oct. 27, 2022 (24 pages).
Johnson Solid State LLC, "Cooling Logic Overview," URL: http://coolinglogic.com/documents/CoolingLogic_Overview_High_Quality.mp4, retrieved from internet Oct. 27, 2022 (16 pages).
Johnson Solid State LLC, "So what is CoolingLogic™?" URL: http://coolinglogic.com/Coolinglogic-How-it-Works.html, retrieved from the internet Oct. 27, 2022 (3 pages).
Johnson, David, "A Method to Increase HVAC System Efficiency And Decrease Energy Consumption," White Paper: Johnson Solid State, LLC, URL: http://coolinglogic.com/documents/16102106_White_Paper_High_Resolution_Protected.pdf, Sep. 24, 2016 (51 pages).
Johnson, David, "CoolingLogic™: Mosaic Christian Church A Case Study," Report: Johnson Solid State, LLC, URL: http://coolinglogic.com/documents/19020301_Mosaic_Christian_Coolinglogic_Case_Study.pdf, Feb. 2, 2019 (140 pages).
Johnson, David, "Excel Rehabilitation Building Automation: Building Automation System User Manual ," URL: http://cooljohnson.com/Building-Automation-Systems-Michigan/Waterford-Michigan/Building-Automation-System-Excel-Manual.html, 2012 (10 pages).
Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).
Johnson, David., "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).
International Search Report and Written Opinion on PCT Appl. No. PCT/US2022/044034 dated Dec. 20, 2022 (12 pages).
International Search Report and Written Opinion on PCT Appl. No. PCT/US2023/020413 dated Jun. 20, 2023 (12 pages).
International Search Report and Written Opinion on PCT Appl. No. PCT/US2023/020414 dated Jun. 15, 2023 (22 pages).
U.S. Appl. No. 17/668,791, filed Feb. 10, 2022.
U.S. Appl. No. 17/686,320, filed Mar. 3, 2022.
U.S. Appl. No. 17/688,054, filed Mar. 7, 2022.
U.S. Appl. No. 17/692,642, filed Mar. 11, 2022.
U.S. Appl. No. 17/697,772, filed Mar. 17, 2022.
U.S. Appl. No. 17/826,916, filed May 27, 2022.
U.S. Appl. No. 17/826,921, filed May 27, 2022.
U.S. Appl. No. 17/827,439, filed May 27, 2022.
U.S. Appl. No. 17/839,082, filed Jun. 13, 2022.

\* cited by examiner

SYSTEMS AND METHODS FOR SUSTAINABILITY PLANNING FOR A BUILDING

CROSS-REFERENCE TO RELATED PATENT APPLICATIONS

This application claims the benefit of and priority to U.S. Provisional Patent Application No. 63/246,177 filed Sep. 20, 2021 and this application claims the benefit of and priority to U.S. Provisional Patent Application No. 63/336,935 filed Apr. 29, 2022, the entirety of both of which are incorporated by reference herein.

SUMMARY

One implementation of the present disclosure is a building system for improving sustainability of a building. The building includes a plurality of pieces of building equipment that control one or more environmental conditions of the building based on operational settings. The building system includes one or more storage devices storing instructions thereon that, when executed by one or more processors, cause the one or more processors to determine, using data that pertains to at least one of the building or the plurality of pieces of building equipment, a plurality of baseline values for a plurality of sustainability parameters associated with the building. The instructions also cause the one or more processors to receive a user defined sustainability goal for at least a subset of the plurality of sustainability parameters. The instructions also cause the one or more processors to analyze operating parameters of at least a portion of the plurality of pieces of building equipment to determine one or more changes to the operating parameters predicted to fulfill the user defined sustainability goal, alone or in combination with one or more other changes to the building. The instructions also cause the one or more processors to provide one or more recommendations to implement the one or more changes to the operating parameters to meet the user defined sustainability goal. The instructions also cause the one or more processors to receive a command to implement at least one change of the one or more changes to the operating parameters. The instructions also cause the one or more processors to determine a revised set of operating parameters for at least a first piece of building equipment of the plurality of pieces of building equipment responsive to the command to implement the at least one change to the operating parameters.

In some embodiments, the instructions cause the one or more processors to transmit, to the first piece of building equipment of the plurality of pieces of building equipment, a control signal, where the control signal causes the revised set of operating parameters for the first piece of building equipment to be implemented. The instructions also cause the one or more processors to detect, responsive to the transmittal of the control signals, a change in at least one sustainability parameter of the plurality of sustainability parameters associated with the building, wherein the change indicates an improvement in the user defined sustainability goal. The instructions also cause the one or more processors to determine that the change in at least the one sustainability parameter of the plurality of sustainability parameters reflects the revised set of operating parameters for at least the first piece of building equipment of the plurality of pieces of building equipment.

In some embodiments, the instructions cause the one or more processors to detect a change in a sustainability parameter of the plurality of sustainability parameters. The instructions also cause the one or more processors to update, responsive to determining that the change in the sustainability parameter indicates that a sustainability goal for the sustainability parameter is noncompliant, the one or more recommendations to include a new recommendation, where the new recommendation addresses the change in the sustainability parameter. The instructions also cause the one or more processors to execute, responsive to receiving an indication to accept the new recommendation, the new recommendation, wherein executing the new recommendation causes control signals to be transmitted to at least one piece of building equipment of the plurality of pieces of building equipment and the control signals adjust operational parameters of at least the one piece of building equipment of the plurality of pieces of building equipment.

In some embodiments, the instructions cause the one or more processors to determine, for an action that pertains to at least one piece of building equipment of the plurality of pieces of building equipment, a predicted impact on a sustainability parameter of the plurality of sustainability parameters. The instructions also cause the one or more processors to compare the predicted impact with the user defined sustainability goal. The instructions also cause the one or more processors to prevent, in response to determining that the predicted impact violates a sustainability goal for the sustainability parameter, the action from occurring.

In some embodiments, the instructions cause the one or more processors to determine, using the data that pertains to the plurality of pieces of building equipment, a plurality of building systems that pertain to the plurality of pieces of building equipment. The instructions also cause the one or more processors to generate, using the data that pertains to the plurality of building systems, a contribution factor for a building system of the plurality of building systems. The instructions also cause the one or more processors to generate, using the contribution factor for the building system of the plurality of building systems, a recommendation that addresses the contribution factor of the building system of the plurality of building systems, the recommendation includes a plurality of changes to operational parameters of one or more pieces of building equipment included in the building system. The instructions also cause the one or more processors to execute the recommendation causing changes to the operational parameters of the one or more pieces of building equipment included in the building system.

In some embodiments, the instructions cause the one or more processors to receive, from a user device, a selection of a recommendation from the one or more recommendations. The instructions also cause the one or more processors to determine, using the recommendation, a piece of building equipment of the plurality of pieces of building equipment that pertains to the recommendation. The instructions also cause the one or more processors to execute the recommendation causing changes to operational parameters of the piece of building equipment. The instructions also cause the one or more processors to detect a change in a sustainability parameter of the plurality of sustainability parameters responsive to changing the operational parameters of the piece of building equipment.

In some embodiments, the instructions cause the one or more processors to detect, using the data that pertains to the building, a new piece of building equipment. The instructions also cause the one or more processors to associate the new piece of building equipment with a sustainability parameter of the plurality of sustainability parameters. The instructions also cause the one or more processors to generate, in response to associating the new piece of building equipment with the sustainability parameter, a recommendation that addresses a sustainability goal of the sustainability parameter, where the recommendation includes one or more actions, executable by the new piece of building equipment, that meet the sustainability goal of the sustainability parameter.

In some embodiments, the instructions cause the one or more processors to determine, using data that pertains to at least one the building or the plurality of pieces of building equipment, a contribution factor for a piece of building equipment of the plurality of pieces of building equipment, wherein the contribution factor indicates contribution of the piece of building equipment in relation to a sustainability parameter of the plurality of sustainability parameters. The instructions also cause the one or more processors to determine, using the contribution factor for the piece of building equipment and a predetermined contribution factor index, a benchmark index for the piece of building equipment.

In some embodiments, the instructions cause the one or more processors to cause a user device to display, via a user interface, a prompt to select, from the plurality of pieces of building equipment or a plurality of building equipment types that pertain to the plurality of pieces of building equipment, a piece of building equipment or a building equipment type to be sized. The instructions also cause the one or more processors to identify the piece of equipment or the building equipment type selected from the plurality of pieces of building equipment or the plurality of building equipment types. The instructions also cause the one or more processors to determine, using the data that pertains to the building, a size for the piece of building equipment or the building equipment type, the size optimizes at least one of a load for the piece of building equipment or the building equipment type, a capacity for the piece of building equipment or the building equipment type or a cost associated with the piece of building equipment or the building equipment type.

In some embodiments, the instructions cause the one or more processors to detect, using the data that pertains to the building, a change in a sustainability parameter of the plurality of sustainability parameters. The instructions also cause the one or more processors to determine, using the change in the sustainability parameter, a trend associated with the sustainability parameter, the trend indicates progress made towards a sustainability goal for the sustainability parameter. The instructions also cause the one or more processors to cause a user device to display, via a user interface, a graphical representation of the trend, where the graphical representation of the trend includes at least one of a baseline value for the sustainability parameter, a current value for the sustainability parameter, a difference between the baseline value and the current value or the sustainability goal that relates to the sustainability parameter.

In some embodiments, the plurality of sustainability parameters includes at least one of carbon emissions, energy consumption, water consumption, waste production, gas consumption, solar power consumption or wind turbine electric consumption.

Another implementation of the present disclosure is a method for improving sustainability of a building. The method includes determining, by a processing circuit, using data that pertains to at least one of the building or the plurality of pieces of building equipment, a plurality of baseline values for a plurality of sustainability parameters associated with the building. The method includes receiving, by the processing circuit, a user defined sustainability goal for at least a subset of the plurality of sustainability parameters. The method includes analyzing, by the processing circuit, operating parameters of at least a portion of the plurality of pieces of building equipment to determine one or more changes to the operating parameters predicted to fulfill the user defined sustainability goal, alone or in combination with one or more other changes to the building. The method includes providing, by the processing circuit, one or more recommendations to implement the one or more changes to the operating parameters to meet the user defined sustainability goal. The method includes receiving, by the processing circuit, a command to implement at least one change of the one or more changes to the operating parameters. The method includes determining, by the processing circuit, a revised set of operating parameters for at least a first piece of building equipment of the plurality of pieces of building equipment responsive to the command to implement the at least one change to the operating parameters.

In some embodiments, the method includes transmitting, by the processing circuit, to the first piece building equipment of the plurality of pieces of building equipment, a control signal, wherein the control signal causes the revised set of operating parameters for the first piece of building equipment to be implemented. The method includes detecting, by the processing circuit, responsive to the transmittal of the control signals, a change in at least one sustainability parameter of the plurality of sustainability parameters associated with the building, wherein the change indicates an improvement in the user defined sustainability goal. The method includes determining, by the processing circuit, that the change in at least the one sustainability parameter of the plurality of sustainability parameters reflects the revised set of operating parameters for at least the first piece of building equipment of the plurality of pieces of building equipment.

In some embodiments, the method includes detecting, by the processing circuit, a change in a sustainability parameter of the plurality of sustainability parameters. The method includes updating, by the processing circuit, responsive to determining that the change in the sustainability parameter indicates that a sustainability goal for the sustainability parameter is noncompliant, the one or more recommendations to include a new recommendation, where the new recommendation addresses the change in the sustainability parameter. The method includes executing, by the processing circuit, responsive to receiving an indication to accept the new recommendation, the new recommendation, wherein executing the new recommendation causes control signals to be transmitted to at least one piece of building equipment of the plurality of pieces of building equipment and the control signals adjust operational parameters of at least one piece of building equipment of the plurality of pieces of building equipment.

In some embodiments, the method includes determining, by the processing circuit, for an action that pertains to at least one piece of building equipment of the plurality of pieces of building equipment, a predicted impact on a sustainability parameter of the plurality of sustainability parameters. The method includes comparing, by the processing circuit, the predicted impact with the user defined sustainability goal. The method includes preventing, by the processing circuit, in response to determining that the predicted impact violates a sustainability goal for the sustainability parameter, the action from occurring.

In some embodiments, the method includes determining, by the processing circuit, using the data that pertains to the plurality of pieces of building equipment, a plurality of building systems that pertain to the plurality of pieces of building equipment. The method includes generating, by the processing circuit, using the data that pertains to the plurality of building systems; a contribution factor for a building system of the plurality of building systems. The method includes generating, by the processing circuit, using the contribution factor of the building system of the plurality of building systems, a recommendation that addresses the contribution factor of the building system of the plurality of building systems, the recommendation includes a plurality of changes to operational parameters of one or more pieces of building equipment included in the building system. The method includes executing, by the processing circuit, the recommendation causing changes to the operational parameters of the one or more pieces of building equipment included in the building system.

In some embodiments, the method includes receiving, by the processing circuit, from a user device, a selection of a recommendation from the one or more recommendations. The method includes determining, by the processing circuit, using the recommendation, a piece of building equipment of the plurality of pieces of building equipment that pertains to the recommendation. The method includes executing, by the processing circuit, the recommendation causing changes to operational parameters of the piece of building equipment. The method includes detecting, by the processing circuit, a change in a sustainability parameter of the plurality of sustainability parameters responsive to changing the operational parameters of the piece of building equipment.

In some embodiments, the method includes detecting, by the processing circuit, using the data that pertains to the building, a new piece of building equipment. The method includes associating, by the processing circuit, the new piece of building equipment with a sustainability parameter of the plurality of sustainability parameters. The method includes generating, by the processing circuit, in response to associating the new piece of building equipment with the sustainability parameter, a recommendation that addresses a sustainability goal of the sustainability parameter, the recommendation includes one or more actions, executable by the new piece of building equipment, that meet the sustainability goal of the sustainability parameter.

Another implementation of the present disclosure is a building system for improvising sustainability of a building. The building includes a plurality of pieces of building equipment that control one or more environmental conditions of the building based on operational settings. The building system includes one or more computer-readable storage media having instructions stored thereon that, when executed by one or more processors, cause the one or more processors to implement operations comprising determining, using data that pertains to at least one of the building or the plurality of pieces of building equipment, a plurality of baseline values for a plurality of sustainability parameters associated with the building. The operations comprising receiving a user defined sustainability goal for at least a subset of the plurality of sustainability parameters. The operations comprising analyzing operating parameters of at least a portion of the plurality of pieces of building equipment to determine one or more changes to the operating parameters predicted to fulfill the user defined sustainability goal, alone or in combination with one or more other changes to the building. The operations comprising providing one or more recommendations to implement the one or more changes to the operating parameters to meet the user defined sustainability goal. The operations comprising receiving a command to implement at least one change of the one or more changes to the operating parameters. The operations comprising determining a revised set of operating parameters for at least a first piece of building equipment of the plurality of pieces of building equipment responsive to the command to implement the at least one change to the operating parameters.

In some embodiments, the operations comprising transmitting, to the first piece building equipment of the plurality of pieces of building equipment, a control signal, wherein the control signal causes the revised set of operating parameters for the first piece of building equipment to be implemented. The operations comprising detecting, responsive to transmitting the control signals, a change in at least one sustainability parameter of the plurality of sustainability parameters associated with the building, wherein the change indicates an improvement in the user defined sustainability goal. The operations comprising determining that the change in at least the one sustainability parameter of the plurality of sustainability parameters reflects the revised set of operating parameters for at least the first piece of building equipment of the plurality of pieces of building equipment.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Referring generally to the FIGURES, systems and methods are provided for a sustainability optimization for planning a building, according to various exemplary embodiments. A sustainability optimization system can be configured to collect various pieces of information regarding a building, e.g., energy supply data, on-site energy generation systems, demand data, indications of building equipment, etc. The sustainability optimization system can be configured to run an optimization on the collected data to identify improvements for the building that result in sustainable operation of the building. For example, the optimization can optimize for various metrics of the building, e.g., carbon footprint, energy usage, financial cost, etc. The result of the optimization could be to retrofit certain pieces of building equipment, install on-site solar panels, purchase renewable energy credits (RECs), generate a building control plan, etc.

The optimization can, in some embodiments, result in building planning that causes the building to meet a sustainability goal in a particular timeline. For example, the user may have a goal for their building to reach net-zero carbon emissions (or a predefined level of carbon emissions) over the next thirty years. The optimization can run periodically, e.g., every year, to optimize over an optimization period (e.g., the next five years) and to meet the goal over the total planning period (e.g., the next thirty years).

Building Management System and HVAC System

Figure 1:
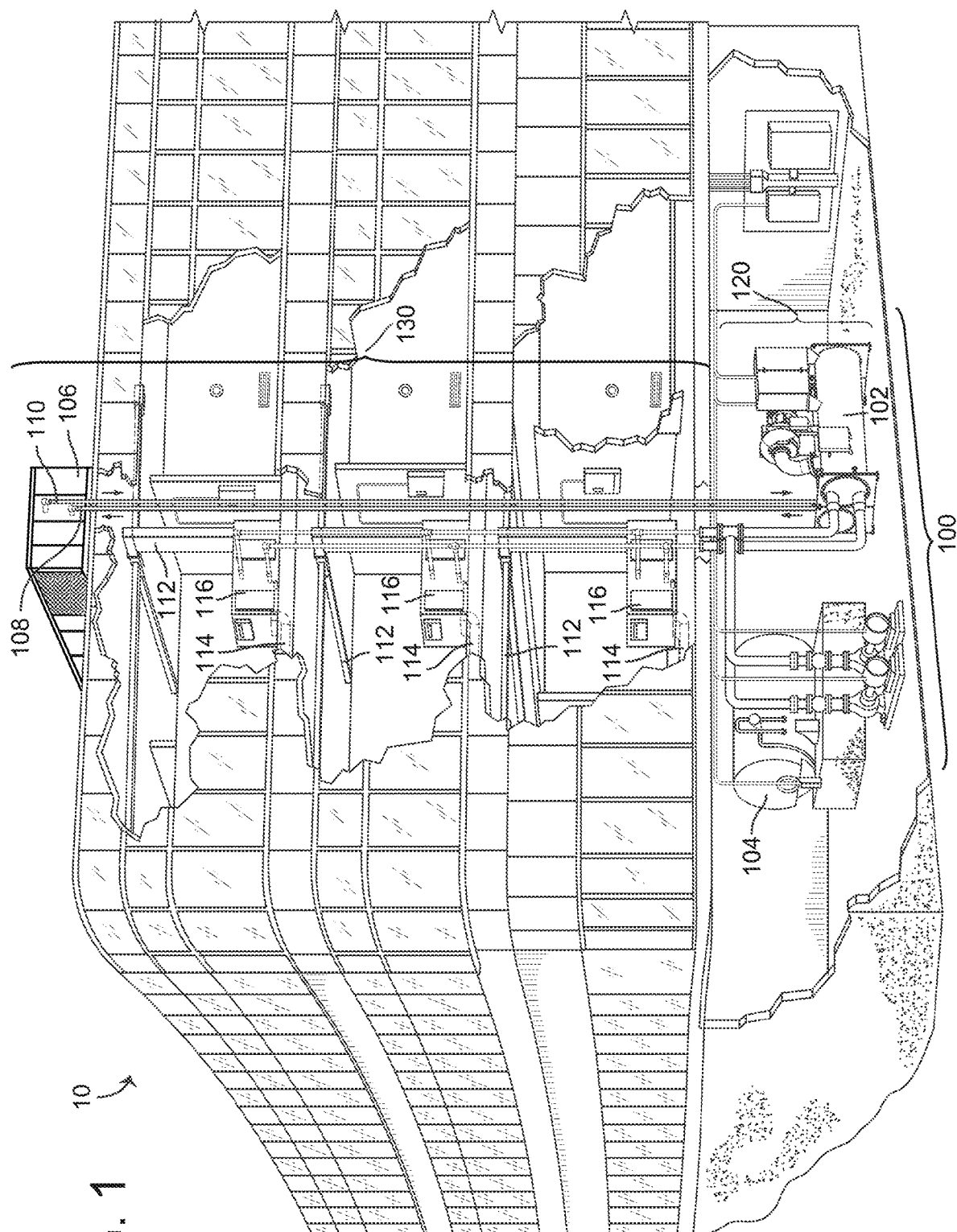
FIG. 1 is a drawing of a building equipped with a HVAC system, according to an exemplary embodiment.

Referring now to FIG. 1, an exemplary building management system (BMS) and HVAC system in which the systems and methods of the present invention can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, and/or any other system that is capable of managing building functions or devices, or any combination thereof The BMS that serves building 10 includes an HVAC system 100. HVAC system 100 can include HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Figure 2:
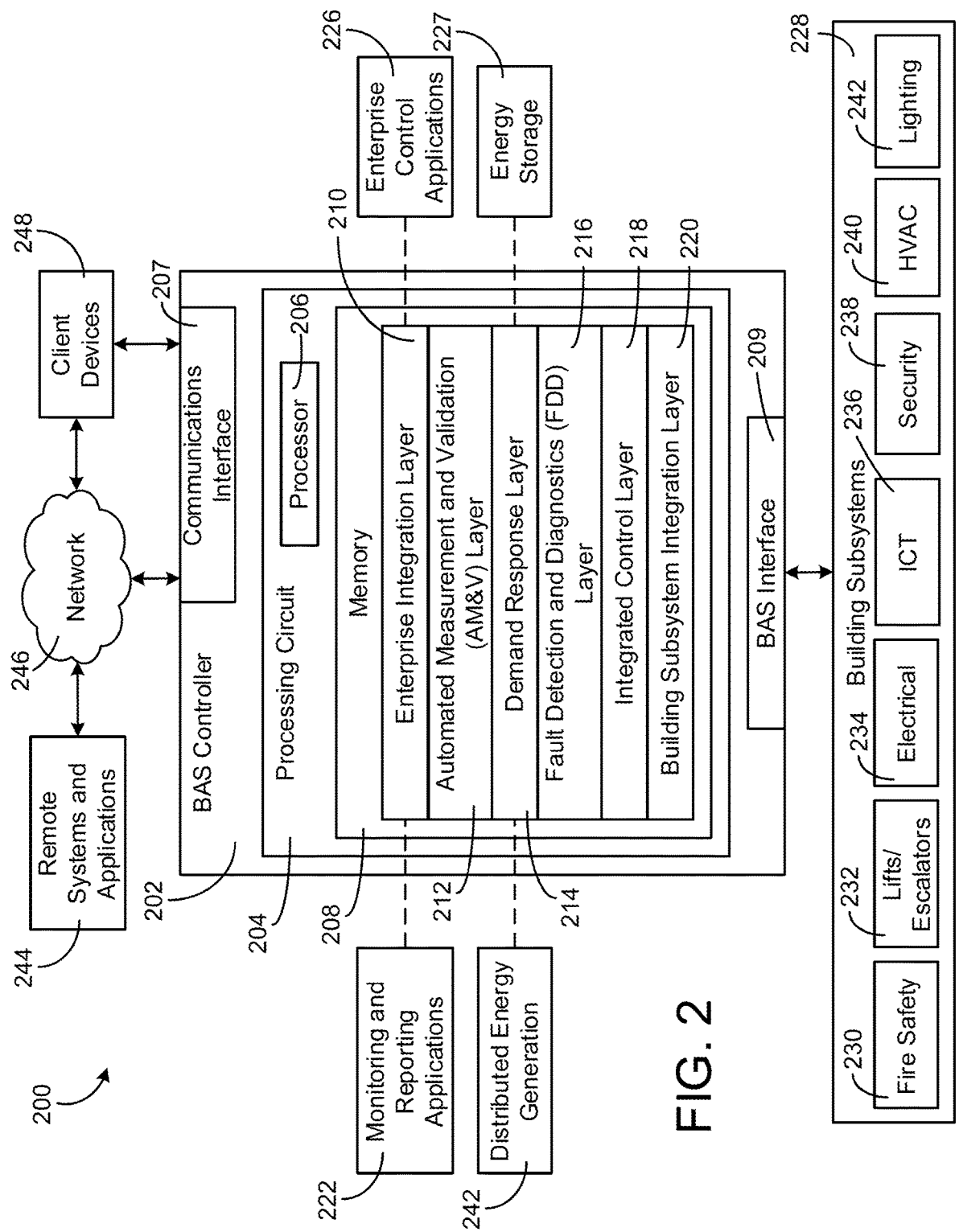
FIG. 2 is a block diagram of a building automation system (BAS) that may be used to monitor and/or control the building of FIG. 1, according to an exemplary embodiment.

Referring now to FIG. 2, a block diagram of a building automation system (BAS) 200 is shown, according to an exemplary embodiment. BAS 200 can be implemented in building 10 to automatically monitor and control various building functions. BAS 200 is shown to include BAS controller 202 and building subsystems 228. Building subsystems 228 are shown to include a building electrical subsystem 234, an information communication technology (ICT) subsystem 236, a security subsystem 238, a HVAC subsystem 240, a lighting subsystem 242, a lift/escalators subsystem 232, and a fire safety subsystem 230. In various embodiments, building subsystems 228 can include fewer, additional, or alternative subsystems. For example, building subsystems 228 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 228 include a waterside system and/or an airside system. A waterside system and an airside system are described with further reference to U.S. patent application Ser. No. 15/631,830 filed Jun. 23, 2017, the entirety of which is incorporated by reference herein.

Each of building subsystems 228 can include any number of devices, controllers, and connections for completing its individual functions and control activities. HVAC subsystem 240 can include many of the same components as HVAC system 100, as described with reference to FIG. 1. For example, HVAC subsystem 240 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 242 can include any number of light fixtures, ballasts, lighting sensors, dimmers, or other devices configured to controllably adjust the amount of light provided to a building space. Security subsystem 238 can include occupancy sensors, video surveillance cameras, digital video recorders, video processing servers, intrusion detection devices, access control devices and servers, or other security-related devices.

Still referring to FIG. 2, BAS controller 202 is shown to include a communications interface 207 and a BAS interface 209. Interface 207 can facilitate communications between BAS controller 202 and external applications (e.g., monitoring and reporting applications 222, enterprise control applications 226, remote systems and applications 244, applications residing on client devices 248, etc.) for allowing user control, monitoring, and adjustment to BAS controller 202 and/or subsystems 228. Interface 207 can also facilitate communications between BAS controller 202 and client devices 248. BAS interface 209 can facilitate communications between BAS controller 202 and building subsystems 228 (e.g., HVAC, lighting security, lifts, power distribution, business, etc.).

Interfaces 207, 209 can be or include wired or wireless communications interfaces (e.g., jacks, antennas, transmitters, receivers, transceivers, wire terminals, etc.) for conducting data communications with building subsystems 228 or other external systems or devices. In various embodiments, communications via interfaces 207, 209 can be direct (e.g., local wired or wireless communications) or via a communications network 246 (e.g., a WAN, the Internet, a cellular network, etc.). For example, interfaces 207, 209 can include an Ethernet card and port for sending and receiving data via an Ethernet-based communications link or network. In another example, interfaces 207, 209 can include a Wi-Fi transceiver for communicating via a wireless communications network. In another example, one or both of interfaces 207, 209 can include cellular or mobile phone communications transceivers. In one embodiment, communications interface 207 is a power line communications interface and BAS interface 209 is an Ethernet interface. In other embodiments, both communications interface 207 and BAS interface 209 are Ethernet interfaces or are the same Ethernet interface.

Still referring to FIG. 2, BAS controller 202 is shown to include a processing circuit 204 including a processor 206 and memory 208. Processing circuit 204 can be communicably connected to BAS interface 209 and/or communications interface 207 such that processing circuit 204 and the various components thereof can send and receive data via interfaces 207, 209. Processor 206 can be implemented as a general purpose processor, an application specific integrated circuit (ASIC), one or more field programmable gate arrays (FPGAs), a group of processing components, or other suitable electronic processing components.

Memory 208 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 208 can be or include volatile memory or non-volatile memory. Memory 208 can include database components, object code components, script components, or any other type of information structure for supporting the various activities and information structures described in the present application. According to an exemplary embodiment, memory 208 is communicably connected to processor 206 via processing circuit 204 and includes computer code for executing (e.g., by processing circuit 204 and/or processor 206) one or more processes described herein.

In some embodiments, BAS controller 202 is implemented within a single computer (e.g., one server, one housing, etc.). In various other embodiments BAS controller 202 can be distributed across multiple servers or computers (e.g., that can exist in distributed locations). Further, while FIG. 2 shows applications 222 and 226 as existing outside of BAS controller 202, in some embodiments, applications 222 and 226 can be hosted within BAS controller 202 (e.g., within memory 208).

Still referring to FIG. 2, memory 208 is shown to include an enterprise integration layer 210, an automated measurement and validation (AM&V) layer 212, a demand response (DR) layer 214, a fault detection and diagnostics (FDD) layer 216, an integrated control layer 218, and a building subsystem integration later 220. Layers 210-220 is configured to receive inputs from building subsystems 228 and other data sources, determine optimal control actions for building subsystems 228 based on the inputs, generate control signals based on the optimal control actions, and provide the generated control signals to building subsystems 228 in some embodiments. The following paragraphs describe some of the general functions performed by each of layers 210-220 in BAS 200.

Enterprise integration layer 210 can be configured to serve clients or local applications with information and services to support a variety of enterprise-level applications. For example, enterprise control applications 226 can be configured to provide subsystem-spanning control to a graphical user interface (GUI) or to any number of enterprise-level business applications (e.g., accounting systems, user identification systems, etc.). Enterprise control applications 226 can also or alternatively be configured to provide configuration GUIs for configuring BAS controller 202. In yet other embodiments, enterprise control applications 226 can work with layers 210-220 to optimize building performance (e.g., efficiency, energy use, comfort, or safety) based on inputs received at interface 207 and/or BAS interface 209.

Building subsystem integration layer 220 can be configured to manage communications between BAS controller 202 and building subsystems 228. For example, building subsystem integration layer 220 can receive sensor data and input signals from building subsystems 228 and provide output data and control signals to building subsystems 228. Building subsystem integration layer 220 can also be configured to manage communications between building subsystems 228. Building subsystem integration layer 220 translate communications (e.g., sensor data, input signals, output signals, etc.) across multi-vendor/multi-protocol systems.

Demand response layer 214 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 224, from energy storage 227, or from other sources. Demand response layer 214 can receive inputs from other layers of BAS controller 202 (e.g., building subsystem integration layer 220, integrated control layer 218, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 214 includes control logic for responding to the data and signals it receives. These responses can include communicating with the control algorithms in integrated control layer 218, changing control strategies, changing setpoints, or activating/deactivating building equipment or subsystems in a controlled manner. Demand response layer 214 can also include control logic configured to determine when to utilize stored energy. For example, demand response layer 214 can determine to begin using energy from energy storage 227 just prior to the beginning of a peak use hour.

In some embodiments, demand response layer 214 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 214 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 214 can further include or draw upon one or more demand response policy definitions (e.g., databases, XML, files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable setpoint adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 218 can be configured to use the data input or output of building subsystem integration layer 220 and/or demand response later 214 to make control decisions. Due to the subsystem integration provided by building subsystem integration layer 220, integrated control layer 218 can integrate control activities of the subsystems 228 such that the subsystems 228 behave as a single integrated supersystem. In an exemplary embodiment, integrated control layer 218 includes control logic that uses inputs and outputs from building subsystems to provide greater comfort and energy savings relative to the comfort and energy savings that separate subsystems could provide alone. For example, integrated control layer 218 can be configured to use an input from a first subsystem to make an energy-saving control decision for a second subsystem. Results of these decisions can be communicated back to building subsystem integration layer 220.

Integrated control layer 218 is shown to be logically below demand response layer 214. Integrated control layer 218 can be configured to enhance the effectiveness of demand response layer 214 by enabling building subsystems 228 and their respective control loops to be controlled in coordination with demand response layer 214. This configuration can reduce disruptive demand response behavior relative to conventional systems. For example, integrated control layer 218 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 218 can be configured to provide feedback to demand response layer 214 so that demand response layer 214 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 218 is also logically below fault detection and diagnostics layer 216 and automated measurement and validation layer 212. Integrated control layer 218 can be configured to provide calculated inputs (e.g., aggregations) to these higher levels based on outputs from more than one building subsystem.

Automated measurement and validation (AM&V) layer 212 can be configured to verify that control strategies commanded by integrated control layer 218 or demand response layer 214 are working properly (e.g., using data aggregated by AM&V layer 212, integrated control layer 218, building subsystem integration layer 220, FDD layer 216, or otherwise). The calculations made by AM&V layer 212 can be based on building system energy models and/or equipment models for individual BAS devices or subsystems. For example, AM&V layer 212 can compare a model-predicted output with an actual output from building subsystems 228 to determine an accuracy of the model.

Fault detection and diagnostics (FDD) layer 216 can be configured to provide on-going fault detection for building subsystems 228, building subsystem devices (i.e., building equipment), and control algorithms used by demand response layer 214 and integrated control layer 218. FDD layer 216 can receive data inputs from integrated control layer 218, directly from one or more building subsystems or devices, or from another data source. FDD layer 216 can automatically diagnose and respond to detected faults. The responses to detected or diagnosed faults can include providing an alarm message to a user, a maintenance scheduling system, or a control algorithm configured to attempt to repair the fault or to work-around the fault.

FDD layer 216 can be configured to output a specific identification of the faulty component or cause of the fault (e.g., loose damper linkage) using detailed subsystem inputs available at building subsystem integration layer 220. In other exemplary embodiments, FDD layer 216 is configured to provide "fault" events to integrated control layer 218 which executes control strategies and policies in response to the received fault events. According to an exemplary embodiment, FDD layer 216 (or a policy executed by an integrated control engine or business rules engine) can shut-down systems or direct control activities around faulty devices or systems to reduce energy waste, extend equipment life, or assure proper control response.

FDD layer 216 can be configured to store or access a variety of different system data stores (or data points for live data). FDD layer 216 can use some content of the data stores to identify faults at the equipment level (e.g., specific chiller, specific AHU, specific terminal unit, etc.) and other content to identify faults at component or subsystem levels. For example, building subsystems 228 can generate temporal (i.e., time-series) data indicating the performance of BAS 200 and the various components thereof. The data generated by building subsystems 228 can include measured or calculated values that exhibit statistical characteristics and provide information about how the corresponding system or process (e.g., a temperature control process, a flow control process, etc.) is performing in terms of error from its setpoint. These processes can be examined by FDD layer 216 to expose when the system begins to degrade in performance and alarm a user to repair the fault before it becomes more severe.

Figure 3:
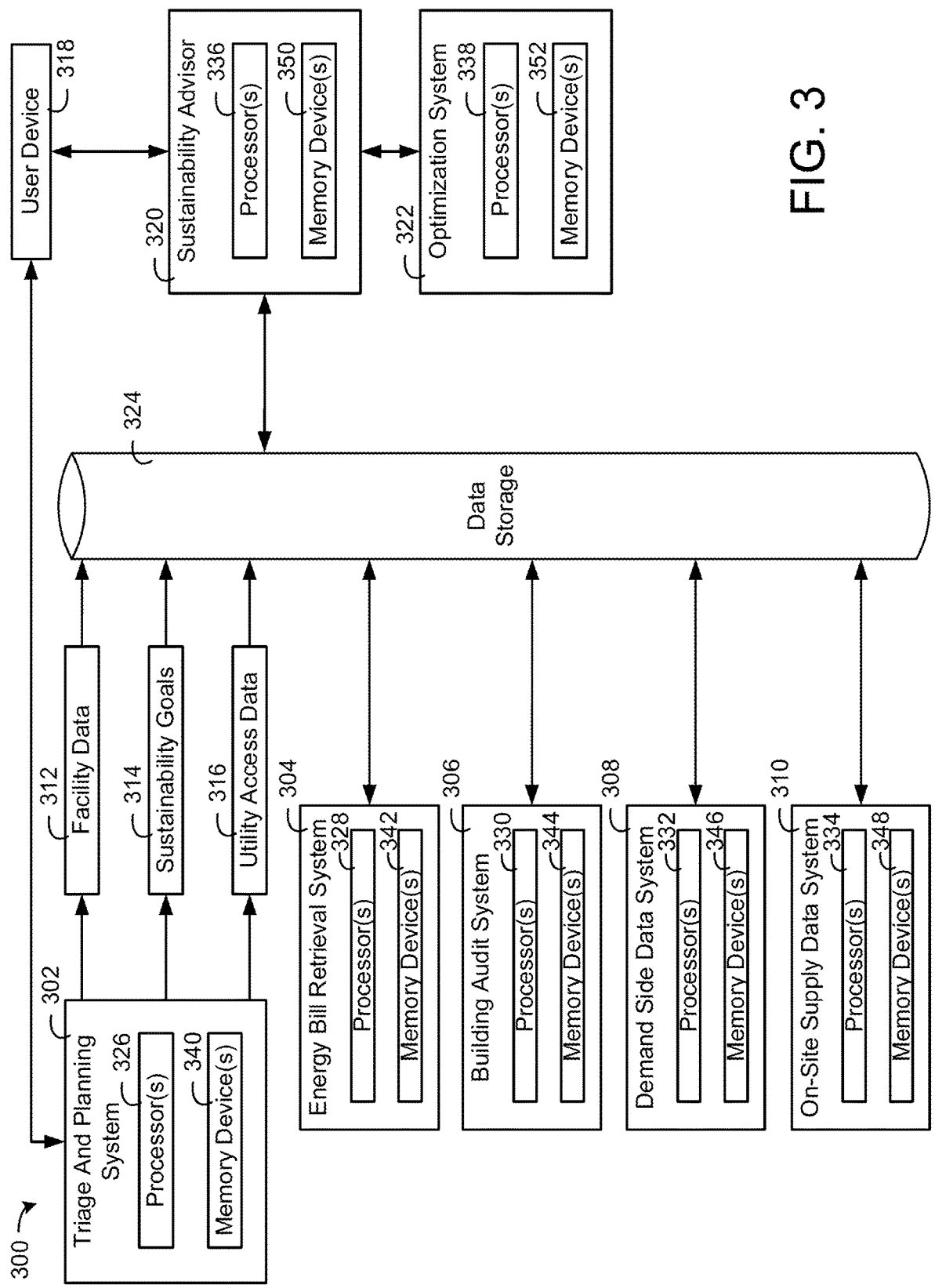
FIG. 3 is a block diagram of a system for sustainability optimization for planning a building, according to an exemplary embodiment.

Referring now to FIG. 3, a system 300 for sustainability optimization for planning a building is shown, according to an exemplary embodiment. The system 300 includes a triage and planning system 302 that is configured to interact with a user, via a user device 318. The system 300 further includes an energy bill retrieval system 304 configured to retrieve energy bills for a building. The system 300 further includes a building audit system 306 configured to collect and aggregate audit data for the building. The system 300 further includes a demand side data system 308 configured to collect demand related data from various building subsystems of a building. The system 300 can include similar components to that of system 200 and/or the system 300 can perform similar functionality that of the system 200.

Furthermore, the system 300 includes an on-site supply data system 310 configured to collect data regarding on-site supply systems of the building. Furthermore, the system 300 includes a sustainability advisor 320 configured to present sustainability related optimization results to a user via the user device 318. The system 300 includes an optimization system 322 configured to run an optimization that can identify optimal building retrofit decisions, building improvements, and/or operating plans.

The components of the system 300 can, in some embodiments, be run as instructions on one or more processors. The instructions can be stored in various memory devices. The processors can be the processors 326-338 and the memory devices can be the memory devices 340-352. The processors 326-338 can be implemented as a general purpose processor, an application specific integrated circuit (ASIC), one or more field programmable gate arrays (FPGAs), a group of processing components, or other suitable electronic processing components. The memory devices 340-352 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. The memory devices 340-352 can be or include volatile memory and/or non-volatile memory.

The memory devices 340-352 can include object code components, script components, or any other type of information structure for supporting the various activities and information structures described in the present application. According to some embodiments, the memory 208 is communicably connected to the processors 326-338 and can include computer code for executing (e.g., by the processors 326-338) one or more processes of functionality described herein.

The system 300 includes data storage 324. The data storage 324 can be a database, a data warehouse, a data lake, a data lake-house, etc. The data storage 324 can store raw data, aggregated data, annotated data, formatted data, etc. The data storage 324 can act as a repository for all data collected from the triage and planning system 302, the energy bill retrieval system 304, the building audit system 306, the demand side data system 308, the on-site supply data system 310, the sustainability advisor 320, the optimization system 322, and/or any other system. In some embodiments, the data storage 324 can, in some embodiments, be a digital twin. The digital twin can, in some embodiments, be a graph data structure. The digital twin can be the digital twin described with reference to U.S. patent application Ser. No. 17/134,664 filed Dec. 28, 2020.

The triage and planning system 302 can provide one or more user interfaces to a user via the user device 318. The user interfaces can allow the user to interact and provide various pieces of information describing a building while the building is in a design phase and/or for an onboarding phase where a user first registers with the system 300 to begin sustainability planning for their building. The triage and planning system 302 can receive facility data 312, sustainability goals 314, and/or utility access data 316. The facility data 312 can describe a building facility, e.g., provide a name of the facility or campus, identify a number of buildings in the facility or campus, identify a use of each building, include a name of each building, indicate campus layout, indicate building size, indicate building square footage, indicate campus square footage, indicate geographic location, etc.

The triage and planning system 302 can receive sustainability goals 314 from the user devices 318. The sustainability goals 314 can be customer goals for their building with respect to energy reduction, carbon creation, carbon footprint, water usage reduction, switching to renewable energy, purchasing a certain number of renewable energy credits, etc. The goals can include target levels for energy consumption, carbon production, net zero carbon emissions, renewable energy, etc. The goals can further include timelines for the various target levels. For example, the timeline could be a period of time into the future, e.g., a number of days, weeks, months, years, decades, etc. The timeline can indicate a target date. For example, the timeline could be that a building is energy independent in the next forty years, or that the building is at a net-zero carbon emissions level in the next twenty five years. In some embodiments, the timelines for the sustainability goals can be returned to the user via the user device 318 with recommendations for meeting certain goals, e.g., a recommendation could be to extend a recommendation by five years (e.g., to 25 year) to hit a certain carbon emissions level which would be more financially feasible than attempting to meet the carbon emissions level in 20 years.

Figure 4:
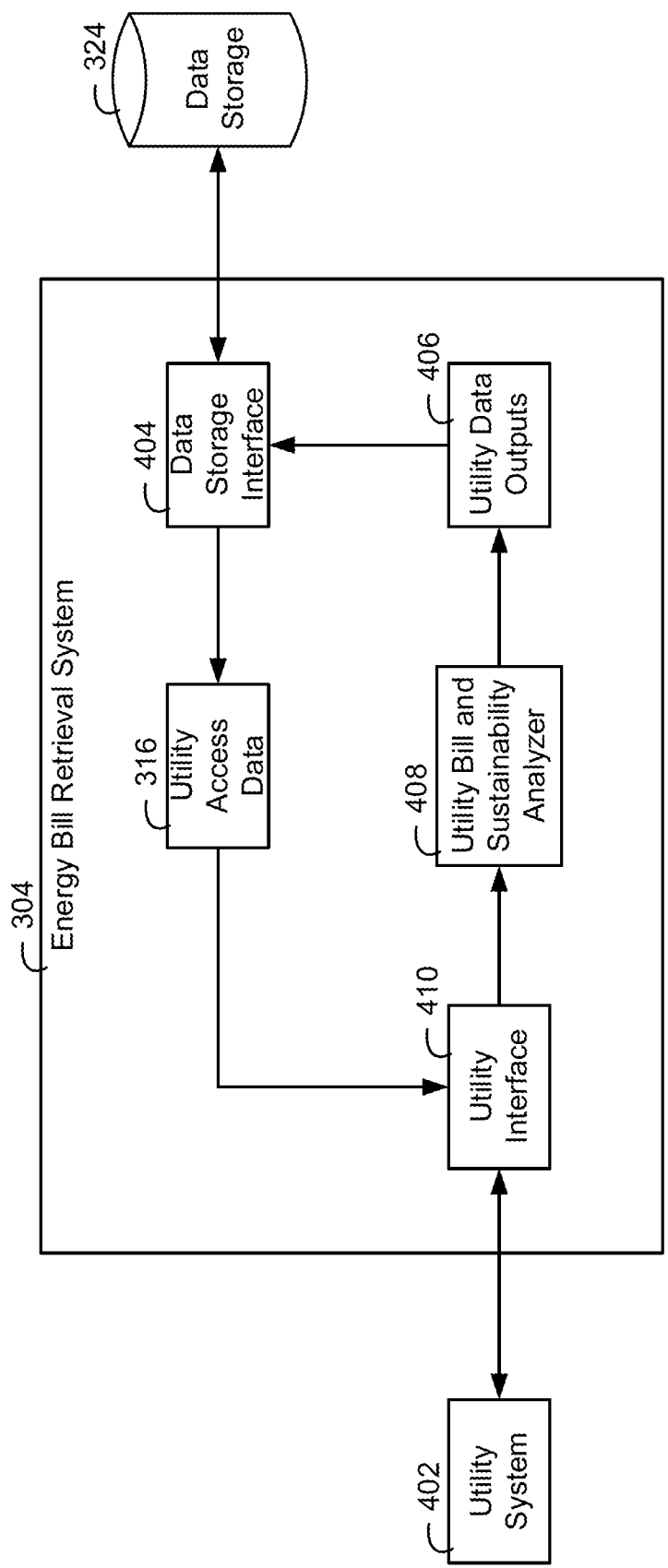
FIG. 4 is a block diagram of an energy bill retrieval system of the sustainability optimization system of FIG. 3, the energy bill retrieval system retrieving utility bills for the building, according to an exemplary embodiment.

Referring now to FIG. 4, energy bill retrieval system 304 of the sustainability optimization system 300, the energy bill retrieval system retrieves utility bills for the building, according to an exemplary embodiment. The energy bill retrieval system 304 can be configured to retrieve utility access data 316 from the data storage 324 via a data storage interface 404. The bills can be electric bills, natural gas bills, water bills, etc. The data storage interface 404 can be an interface that integrates with the data storage 324 via an application programming interface (API) or otherwise exposes and API to external systems. A utility interface 410 can receive the utility access data 316 and retrieve utility bills from a utility system 402 based on the utility access data 316. The utility access data 316 can include a username, a login credential, an email address, an access code, an account number, a name of the energy provider, etc.

A utility interface 410 can, in some embodiments, integrate with the utility system 402 via the utility access data 316. The utility bills can include electricity consumption, water consumption, gas consumption, solar power electric consumption, wind turbine electric consumption, the utility interface 410 can provide the energy bills to a utility bill and sustainability analyzer 408. The analyzer 408 can run various analytics on the utility bills.

For example, the analyzer 408 could identify invoice data, perform an audit on utility bill data, and/or perform an analysis on energy rates and/or tariffs for the energy (e.g., environmental penalties for various forms of energy). The analyzer 408 can identify an energy consumption baseline for the building, identify benchmarking for the building (e.g., compare the baseline of the building to other peer buildings or an industry to determine a benchmark index), determine facility key performance indicators (KPIs), etc.

The analyzer 408 can identify sustainability data, for example, a carbon emissions baseline for the building (e.g., carbon emissions produced from natural gas or carbon emissions from electricity consumption), sustainability benchmarking (e.g., a peer comparison of the emissions baseline for the building against other buildings), renewable energy usage tracking, etc. The analyzer 408 can generate sustainability reports (e.g., an indication between a baseline emissions and a current emissions to show sustainability tracking), management and verification (M&V) reports, etc. The results of the analysis performed by the analyzer 408 can be the utility data outputs 406 which can be stored in the data storage 324 by the data storage interface 404. In some embodiments, the M&V reporting could illustrate savings between a baseline and an improvement for the building. For example, the M&V reporting could indicate a carbon emissions reduction that results (compared to a baseline) from a particular FIM.

Figure 5:
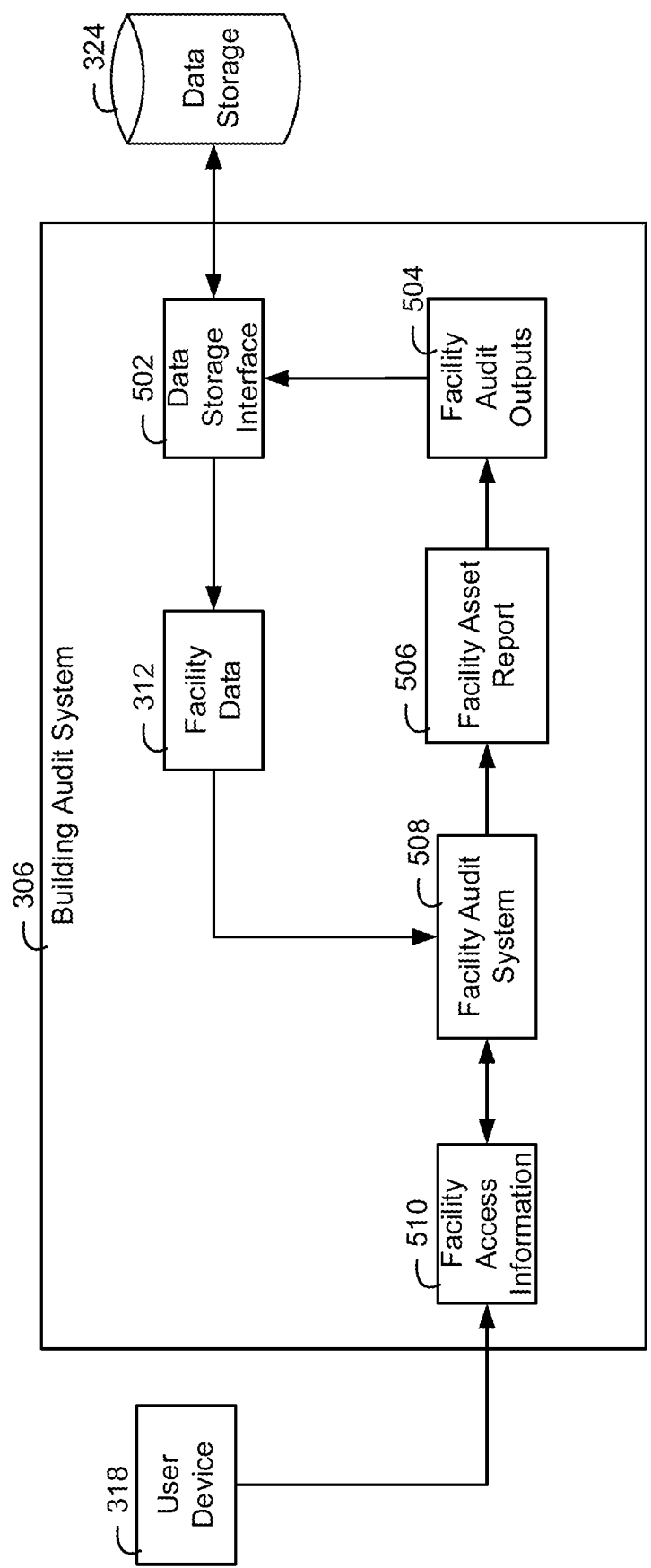
FIG. 5 is a block diagram of a building audit system of the system of FIG. 3, the facility audit system configured to collect building data of the building via an audit, according to an exemplary embodiment.

Referring now to FIG. 5, the building audit system 306 of the system 300 is shown, the building audit system 306 is configured to collect building data of the building via an audit, according to an exemplary embodiment. The building audit system 306 includes a data storage interface 502 that can be the same as, or similar to the data storage interface 404. The interface 504 can retrieve the facility data 312 from the data storage 324. The facility data 312 can be provided to a facility audit system 508. Furthermore, a user, via the user device 318, can provide facility access information 510 (e.g., key codes, registration details, access directions, etc.) to the facility audit system 508. The facility audit system 508 can receive audit details from audit personnel who visit the physical building and record information regarding the building.

Based on the audit data collected by the audit personnel and provided to facility audit system 508, the facility audit system 508 can compile a facility asset report 506. The facility asset report can include information such as a detailed facility description. The facility description can identify each room, zone, and/or floor of a building and indicate the square footage and/or ceiling height of each area of the building. The report 506 can include an equipment inventory. The equipment inventory can indicate the number, make, model, etc. of each piece of equipment in the building. For example, the number and type of chillers in the building could be indicated in the report 506. Furthermore, a maintenance log of all maintenance operations of equipment inventory can be included in the report 506. Furthermore, the report 506 could include photos of all pieces of equipment of the building. The report 506 could further include building envelop information. The result of all the audit outputs of the system 508, including the facility asset report 506, can be stored in the data storage 324 by the data storage interface 502.

Figure 6:
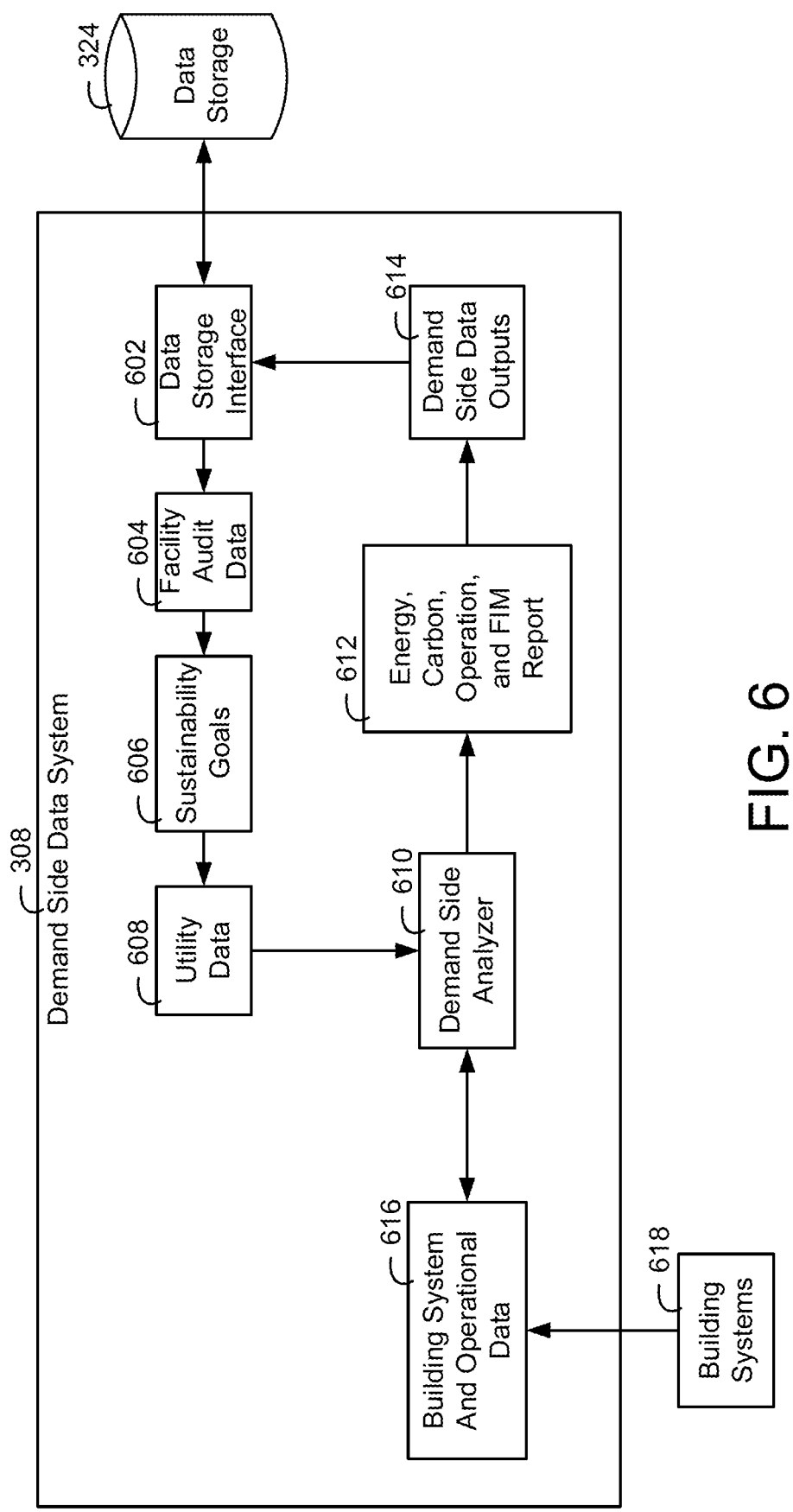
FIG. 6 is a block diagram of a demand side data system of the system of FIG. 3, the demand side data system configured to collect building system and operational data from a building and calculate energy metrics, carbon metrics, operational metrics, and facility improvement measures (FIMs) for the building, according to an exemplary embodiment.

Referring now to FIG. 6, a demand side data system 308 of the system 300, the demand side data system configured to collect building system and operational data from a building and calculate energy metrics, carbon metrics, operational metrics, and facility improvement measures (FIMs) for the building, according to an exemplary embodiment. The system 308 can retrieve facility audit data 604, sustainability goals 606, and/or utility data 608 from the data storage 324 via the data storage interface 602. The data storage interface 602 can be the same as, or similar to, the data storage interface 404. A demand side analyzer 610 can receive the data 604-608. Furthermore, the demand side analyzer 610 can receive building system and/or operational data 616 from the building systems 618. The building system and/or operational data 616 could be metadata for building systems, operating settings for the building systems, runtime data for the building systems, energy usage for the building systems 618, etc. The building systems 618 can be fire safety systems, environmental cooling systems, environmental heating systems, ventilation systems, lighting systems, etc. The building systems 618 can be the systems described with reference to FIGS. 1 and 2.

The demand side analyzer 610 can run an analysis based on the data 604-608 and the building system and/or operational data 616. The analyzer 610 can generate the report 612. The report 612 can indicate an energy breakdown and/or carbon breakdown for demand related systems of the building, e.g., systems that consume energy. The report 612 can indicate an energy consumption level and/or a carbon emissions level for cooling systems of a building, heating systems of a building, lighting systems of the building, etc. The energy consumption level and/or carbon emission level can attribute a portion (e.g., a percentage) of total building energy consumption and/or carbon emissions to specific pieces of equipment, equipment subsystems, subsystem types, building operation modes (heating or cooling), etc.

The analyzer 610 can further identify facility improvement measures (FIMs) for improving and/or reducing energy usage and/or carbon emissions of the building. The FIMs could be replacing a boiler with a newer energy efficient boiler which would result in a particular reduction in energy consumption and/or carbon emission. Furthermore, the analyzer 610 can identify operational improvements, e.g., reducing a temperature setpoint by one degree Fahrenheit during heating over a particular time period to result in a particular energy reduction and/or carbon emissions production. The report 612 can include savings reports. The report 612 can be provided as a demand side data outputs 614 to the interface 602. The interface 602 can store the outputs 614 in the data storage 324. In some embodiments, if the demand side data system 308 is unable to pull data from the building systems 618, the building audit system 306 retrieves the data (e.g., via manual reporting, such as from a building manager, or via other methods).

Figure 7:
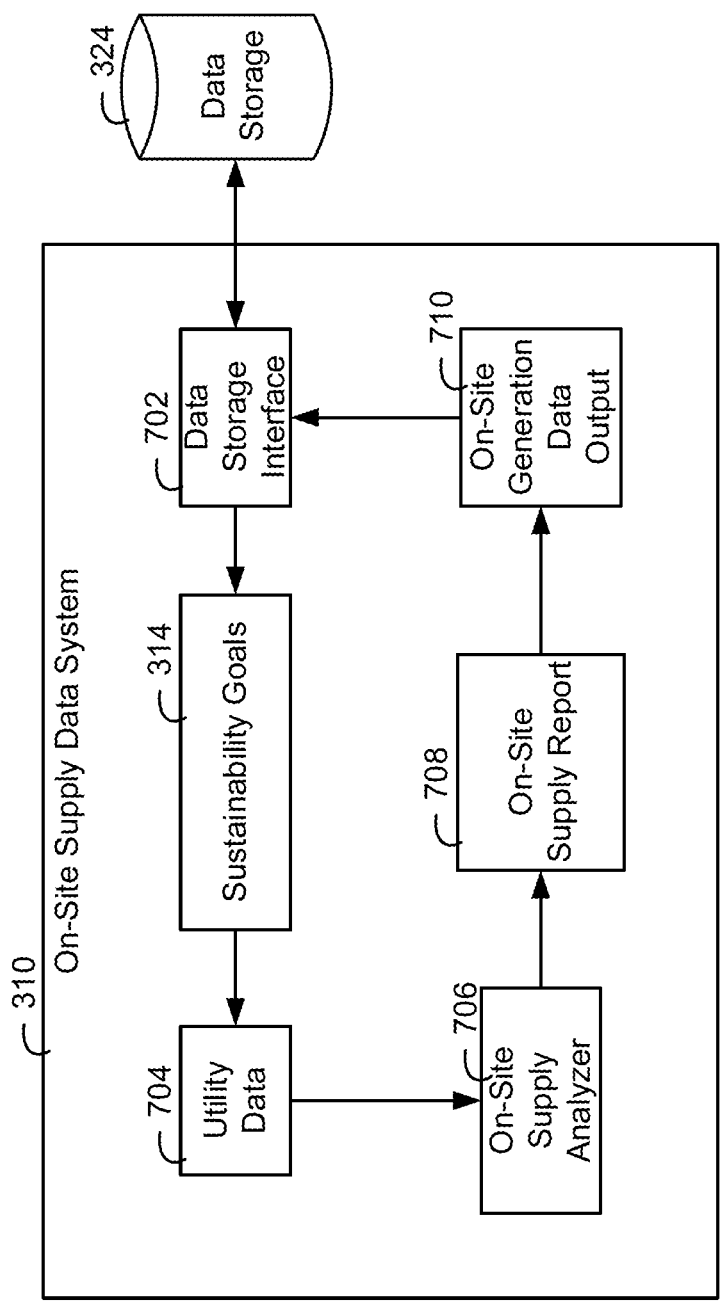
FIG. 7 is a block diagram of an on-site supply data system of the system of FIG. 3, the on-site supply system configured to collect data from an on-site energy supply system for the building, according to an exemplary embodiment.

Referring now to FIG. 7, the on-site supply data system 310 is shown, the on-site supply data system 310 is configured to collect data regarding an on-site energy supply system for the building, according to an exemplary embodiment. The on-site supply data system 310 can include a data storage interface 702 configured to retrieve data from the data storage 324, e.g., the sustainability goals 314 and/or utility data 704 determined by the system 304. The interface 702 can be similar to or the same as the interface 404 described with reference to FIG. 4.

An on-site supply analyzer 706 can analyze the utility data 704 and/or the sustainability goals 314 to determine an on-site supply report 708 that can be stored as on-site generation data output 710 in the data storage 324 by the interface 702. The analyzer 706 can analyze the utility data 704 and/or the sustainability goals 314 to identify opportunities to reduce energy usage and/or carbon emissions through on-site energy supply systems, e.g., solar panels, wind power, hydro-electric dams, re-chargeable batteries, etc. The analyzer 706 can identify opportunities to shift power consumption from an energy grid to an on-site energy supply system.

The report 708 can include the results of an analysis on solar photovoltatic (PV) cells, fuel cells, energy storage, etc. The report 708 can further indicate a renewable energy report, e.g., reports on opportunities to shift energy consumption of the building to renewable energy sources that are on-site. The report 708 can further indicate cost savings for energy, e.g., if solar PV cells were installed in a building, how much financial savings in energy cost would result. Furthermore, the report 708 can indicate sustainability data, e.g., how much carbon savings or carbon production would result from consuming various amounts of energy from on-site PV cells, on-site wind turbines, etc.

Figure 8:
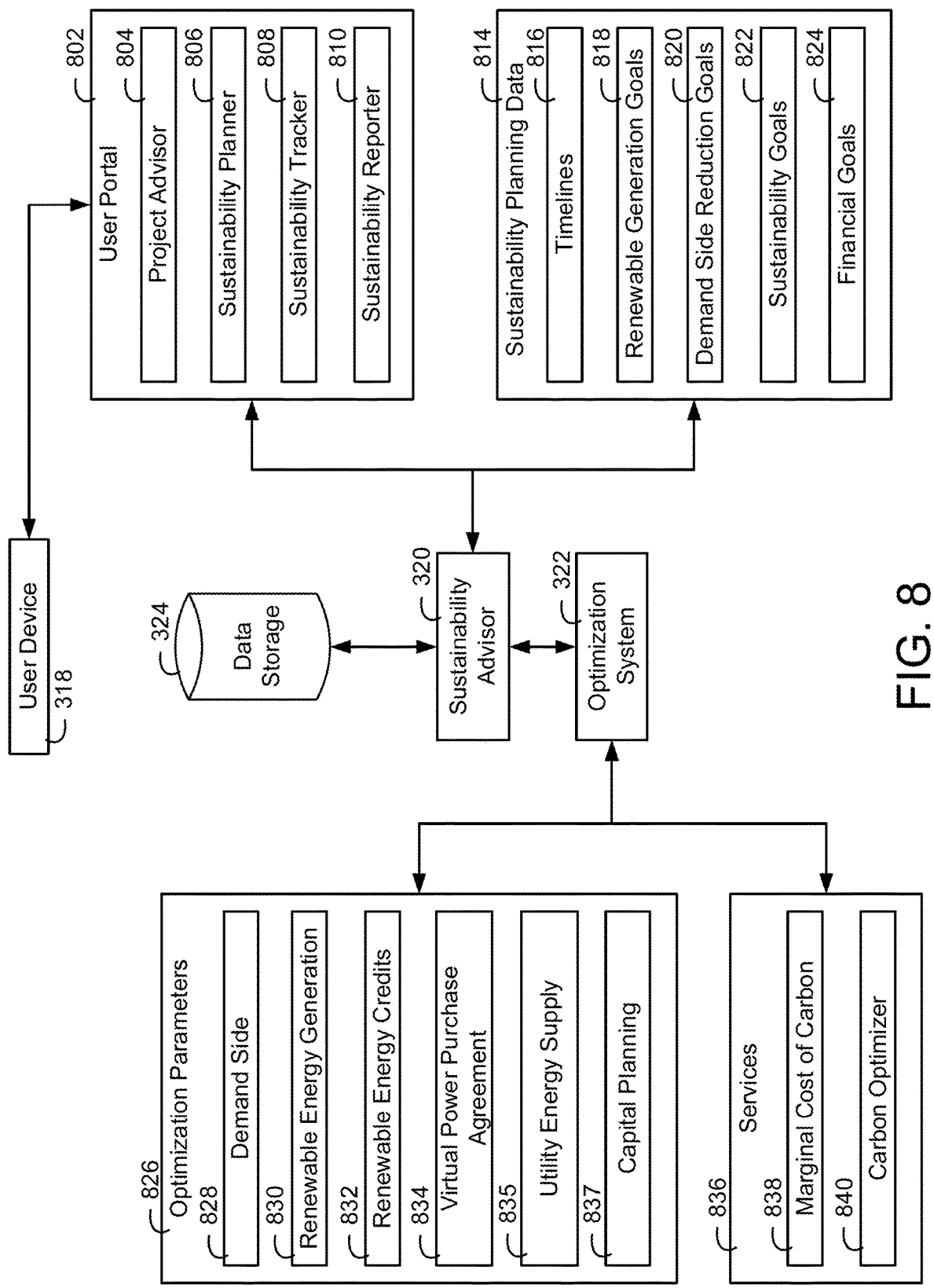
FIG. 8 is a block diagram of a sustainability advisor and an optimization system of the system of FIG. 3, the sustainability advisor configured to provide sustainability data to a user and receive input from the user and the optimization system configured to run sustainability optimizations for the building, according to an exemplary embodiment.

Referring now to FIG. 8, the sustainability advisor 320 and the optimization system 322 are shown, the sustainability advisor 320 is configured to provide sustainability data to a user and receive input from the user and the optimization system 322 is configured to run sustainability optimizations for the building, according to an exemplary embodiment. The sustainability advisor 320 is configured to retrieve data from the data storage 324 (e.g., the data described with reference to FIGS. 3-7) and cause the optimization system 322 to run optimizations based on the data. The sustainability advisor 320 can be configured to manage a user portal 802 which can provide various pieces of information to a user and receive input from the user.

The user portal 802 can interact with a user by causing the user device 318 to display various user interfaces with information regarding cost improvements, energy reduction improvements, and/or carbon emissions reduction improvements for the building. The information displayed in the user portal 802 can be based on the results of the optimizations run by the optimization system 322. The portal 802 can provide various reports and/or recommendations to the user (e.g., recommended FIMs, recommendations to purchase renewable energy credits (RECs), recommendations to adopt updated control strategies, etc.) for planning the construction, retrofit, and/or operation of a building to meet one or more sustainability goals.

The project advisor 804 can allow a user to review, define, and/or update a project. The project may be to plan sustainability for a particular building and/or building. The project advisor 804 can allow a user to set and/or update their sustainability goals. Furthermore, the project advisor 804 can allow a user to review their progress in meeting the sustainability goals for their project.

The sustainability planner 806 can provide a plan for meeting sustainability goals for a particular project. The plan generated by the sustainability planner 806 can be based on the optimizations run by the optimization system 322. In some embodiments, the plan generated by the sustainability planner 806 can be a plan for a time horizon, e.g., a thirty year plan, a twenty year plan, etc. The plan can provide the steps for meeting the sustainability goal of the user. The steps can indicate what equipment retrofits should be performed at a present time or at a specified time in the future, how many RECs should be purchased every year or every decade, what control schemes should be adopted, etc. As time passes, the sustainability planner 806 can update the sustainability plan based on new optimizations run by the optimization system 322. This can keep the plan on track to meet a goal as the environment or technology changes and allows the user to meet their goals in more cost effective manners. The planner 806 can generate plans based on the sustainability planning data 814.

The sustainability tracker 808 can track the progress of the building towards meeting various sustainability goals. The sustainability tracker 808 can, in some embodiments, retrieve operational building data from the data storage 324, energy bills from the data storage 324, receipts of REC purchases from the data storage 324, etc. The sustainability tracker 808 can identify carbon emissions levels for a building at various times in the past and/or at the present. The sustainability tracker 808 can identify a level of renewable energy consumed by the building at times in the past and/or at the present. Furthermore, the sustainability tracker 808 can identify a level of energy consumed by the building at times in the past and/or at the present. The sustainability tracker 808 can provide a user with a historical trend of the sustainability progress of the building towards the one or more sustainability goals.

The user portal 802 includes a sustainability reporter 810. The sustainability reporter 810 can generate various reports indicating sustainability information for the building. The report can indicate a construction plan, retrofit plan, and/or operational plan for a building, e.g., the amounts of energy to consume from various different energy sources, indications of RECs to purchase, indications of equipment retrofits, indications of physical building retrofits (e.g., energy efficient windows, energy efficient insulation, etc.), indications of new equipment installation (e.g., on-site PV cells, on-site wind turbines, etc.). The report generated by the sustainability reporter 810 can indicate how the plan meets one or more sustainability, energy efficiency, and/or financial goals of the user. The sustainability reporter 810 can include a summary report of sustainability planning for the building. The sustainability reporter 810 can compile a report based on the data generated by the components 804-808.

The sustainability planning data 814 includes the planning data that can be used to run the optimization system 322. The sustainability planning data 814 can indicate the various goals and/or expectations of the user. The optimization run by the optimization system 322 can use the sustainability planning data 814 as constraints for an optimization, e.g., run an optimization that results in a plan that meets or exceeds the various goals and/or expectations. In some embodiments, the optimization can find a sustainability plan for the building that meets the various sustainability goals of the user at a minimum financial cost.

The sustainability planning data 814 can be or can be based on the sustainability goals 314. The timelines 816 can indicate the length of time that the user wants the building to meet various goals (e.g., the goals 818-824). The renewable generation goals 818 indicate a level of energy consumption by the building that the user wants to be generated from renewable energy sources (e.g., solar, wind, etc.). The demand side reduction goals 820 can indicate goals for the demand side systems, e.g., that the demand side systems be energy efficient (e.g., that lighting systems of the building include energy efficient light bulbs). The sustainability goals 822 can be a goal that the operation of the building creates a level of carbon emission, net zero emissions goals, etc. The financial goals 824 can indicate financial goals of the building, e.g., annual energy costs, monthly energy costs, etc.

The optimization parameters 826 include demand side parameters 828 related to the energy demand of a building. The demand side parameters 828 can indicate different types of building equipment retrofits, building equipment maintenance operations, new building equipment installation, building equipment replacement, etc. The demand side parameters 828 can indicate actions that can be taken to modify, change, and/or update the demand side equipment of the building. The demand side parameters 828 can further be linked to renewable energy generation, carbon emissions, energy usage, etc.

The renewable energy generation 830 can indicate parameters for installing renewable energy generation equipment at the building. The renewable energy generation 830 can further indicate allocations of energy consumption between external power generation systems, e.g., coal power, hydroelectric power, PV cell systems, wind power systems, etc. The renewable energy generation 830 can be linked to various levels of carbon emissions, financial cost, etc.

The optimization parameters 826 include renewable energy credits 832. The renewable energy credits 832 can be various different types of RECs that could be purchased for the building. The parameters can indicate carbon emissions reduction resulting from purchasing RECs and/or financial return from RECs sold by the building. For example, if the building includes on-site renewable energy generation, the building could sell RECs, in some embodiments. Furthermore, the optimization parameters 826 include a virtual power purchase agreement 834 which can represent an agreed price for renewable energy generation. The parameters can further indicate capital planning 837, e.g., plans for replacing, purchasing, and/or repairing capital of the building (e.g., lighting of the building, conference rooms of the building, audio visual systems, insulation of the building, chillers for the building, AHUs for the building, etc.)

The optimization system 322 can include model services 836. The services 836 can include a marginal cost of carbon 838. The marginal cost of carbon 838 can indicate how much carbon emissions results from the next amount of energy consumed by the building. The marginal cost of carbon can be calculated for external utility services and/or on-site energy generation systems of the building. The marginal cost of carbon can be identified from the various energy bills and/or operational decisions of the building. The marginal cost of carbon can, in some embodiments, be based on the optimization parameters 826. The carbon optimizer 840 can run an optimization that identifies decisions for the optimization parameters 826 that results in a particular carbon emissions level. The optimization can be run for a year, five years, ten years into the future, tec. The optimization can be run to slowly reduce the carbon emissions by a particular level every year so that a particular carbon emissions goal is met in the future. The optimization can be run based on the sustainability goals 822 such that the decisions for the optimization parameters 826 are such that the sustainability goals 822 are met.

Figure 9:
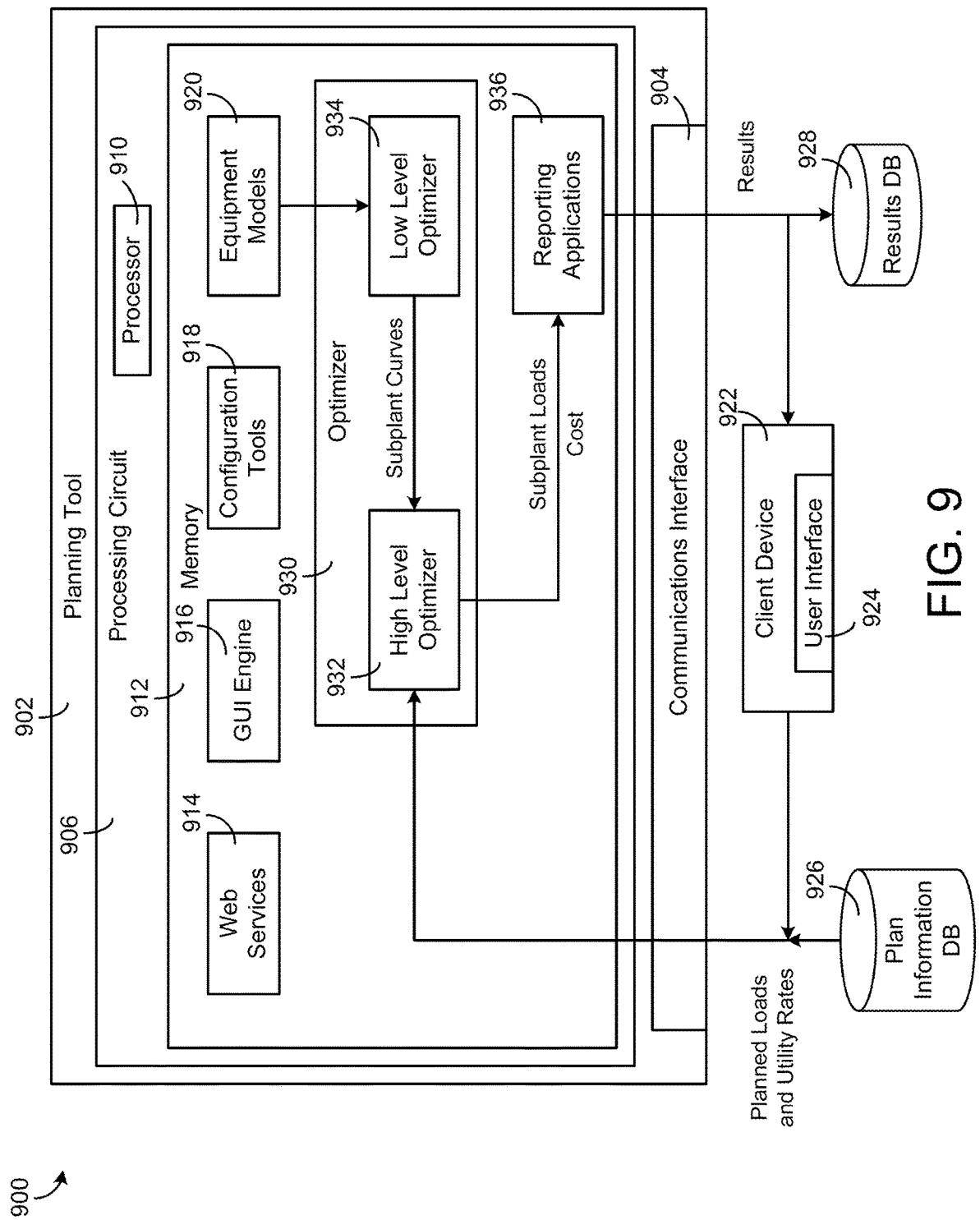
FIG. 9 is a block diagram of a planning tool which can be used to determine the benefits of investing in a battery asset and calculate various financial metrics associated with the investment, according to an exemplary embodiment.
Figure 10:
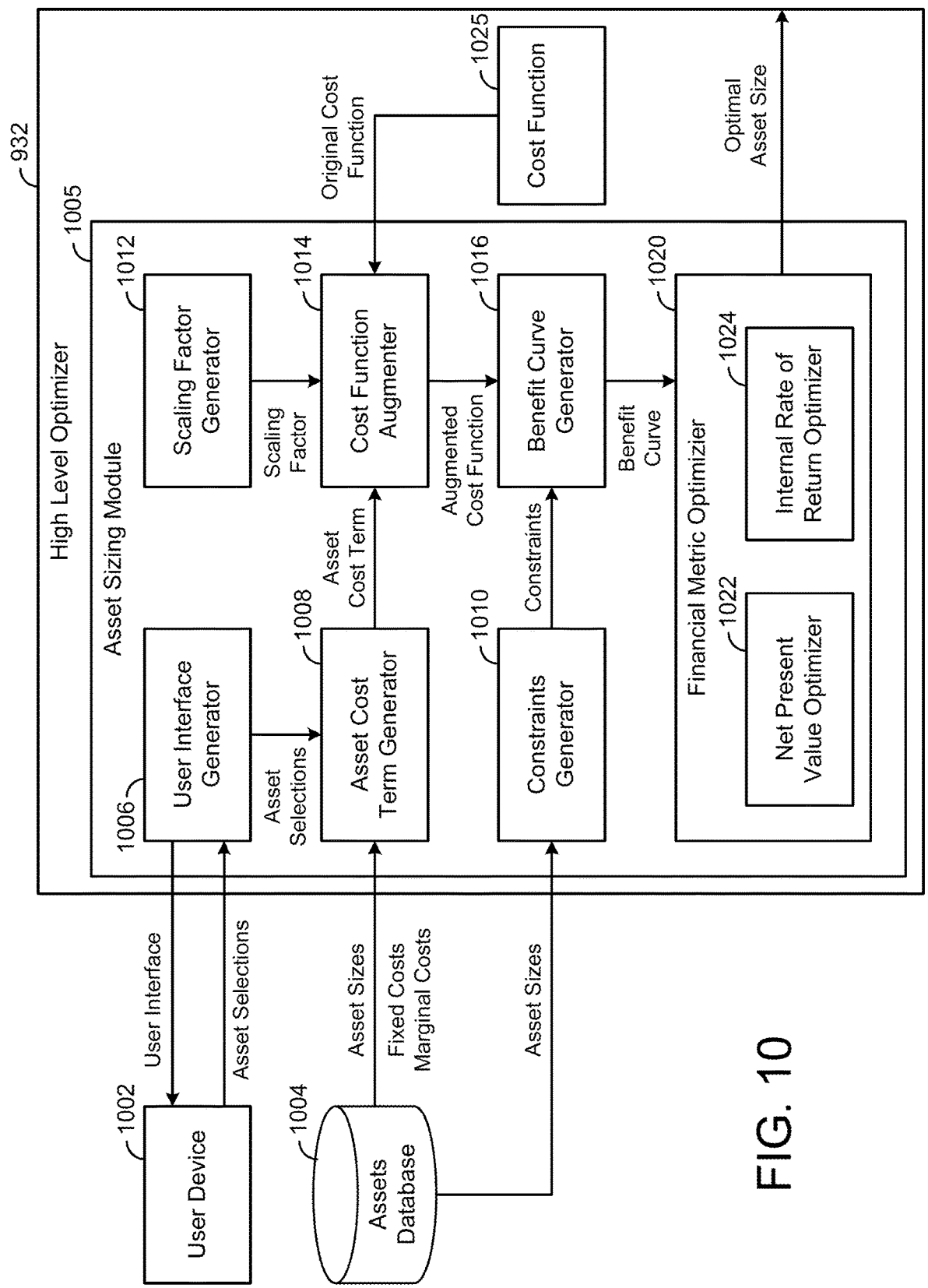
FIG. 10 is a block diagram illustrating the asset sizing module, according to an exemplary embodiment.

In some embodiments, the optimization run by the optimization system 322 can be based on the optimization described in FIGS. 9 and 10. The optimization can be run with the various linear programming techniques described in FIGS. 9 and 10. Furthermore, the optimization of the optimization system 322 can be based on, and/or can utilize, the techniques described in U.S. patent application Ser. No. 16/518,314 filed Jul. 22, 2019, the entirety of which is incorporated by reference herein.

Referring now to FIG. 9, a block diagram of a planning system 900 is shown, according to an exemplary embodiment. Planning system 900 may be configured to use optimizer 930 as part of a planning tool 902 to simulate the operation of a central plant over a predetermined time period (e.g., a day, a month, a week, a year, etc.) for planning, budgeting, and/or design considerations. The optimizer 930 can optimize for planning a building, e.g., identify construction decisions, retrofit decisions, control plans, etc. The optimizer 930 can run an optimization to minimize carbon emissions, minimize energy consumption, minimize energy cost, maximize renewable energy use, etc. In some embodiments, the optimizer 930 can consider building load in addition to sustainability related features. For example, optimizer 930 may use building loads and utility rates to determine an optimal resource allocation to minimize cost over a simulation period. However, planning tool 902 may not be responsible for real-time control of a building management system or central plant, in some embodiments, while in other embodiments planning tool 902 may provide real-time or near real-time control of a building management system or portions thereof to help achieve the particular goals. In some implementations, planning tool 902 may provide actionable insights or suggestions that, upon approval by a user, are automatically implemented by the building management system or automatically generate changes to a building plan (e.g., pre-construction building plan).

Planning tool 902 can be configured to determine the benefits of investing in a battery asset and the financial metrics associated with the investment. Such financial metrics can include, for example, the internal rate of return (IRR), net present value (NPV), and/or simple payback period (SPP). Planning tool 902 can also assist a user in determining the size of the battery which yields optimal financial metrics such as maximum NPV or a minimum SPP. In some embodiments, planning tool 902 allows a user to specify a battery size and automatically determines the benefits of the battery asset from participating in selected IBDR programs while performing PBDR. In some embodiments, planning tool 902 is configured to determine the battery size that minimizes SPP given the IBDR programs selected and the requirement of performing PBDR. In some embodiments, planning tool 902 is configured to determine the battery size that maximizes NPV given the IBDR programs selected and the requirement of performing PBDR.

In planning tool 902, high level optimizer 932 may receive planned loads and utility rates for the entire simulation period. The planned loads and utility rates may be defined by input received from a user via a client device 922 (e.g., user-defined, user selected, etc.) and/or retrieved from a plan information database 926. High level optimizer 932 uses the planned loads and utility rates in conjunction with subplant curves from low level optimizer 934 to determine an optimal resource allocation (i.e., an optimal dispatch schedule) for a portion of the simulation period. The low level optimizer 934 can receive equipment models 920, in some embodiments.

The portion of the simulation period over which high level optimizer 932 optimizes the resource allocation may be defined by a prediction window ending at a time horizon. With each iteration of the optimization, the prediction window is shifted forward and the portion of the dispatch schedule no longer in the prediction window is accepted (e.g., stored or output as results of the simulation). Load and rate predictions may be predefined for the entire simulation and may not be subject to adjustments in each iteration. However, shifting the prediction window forward in time may introduce additional plan information (e.g., planned loads and/or utility rates) for the newly-added time slice at the end of the prediction window. The new plan information may not have a significant effect on the optimal dispatch schedule since only a small portion of the prediction window changes with each iteration.

In some embodiments, high level optimizer 932 requests all of the subplant curves used in the simulation from low level optimizer 934 at the beginning of the simulation. Since the planned loads and environmental conditions are known for the entire simulation period, high level optimizer 932 may retrieve all of the relevant subplant curves at the beginning of the simulation. In some embodiments, low level optimizer 934 generates functions that map subplant production to equipment level production and resource use when the subplant curves are provided to high level optimizer 932. These subplant to equipment functions may be used to calculate the individual equipment production and resource use (e.g., in a post-processing module) based on the results of the simulation.

Still referring to FIG. 9, planning tool 902 is shown to include a communications interface 904 and a processing circuit 906. Communications interface 904 may include wired or wireless interfaces (e.g., jacks, antennas, transmitters, receivers, transceivers, wire terminals, etc.) for conducting data communications with various systems, devices, or networks. For example, communications interface 904 may include an Ethernet card and port for sending and receiving data via an Ethernet-based communications network and/or a WiFi transceiver for communicating via a wireless communications network. Communications interface 904 may be configured to communicate via local area networks or wide area networks (e.g., the Internet, a building WAN, etc.) and may use a variety of communications protocols (e.g., BACnet, IP, LON, etc.).

Communications interface 904 may be a network interface configured to facilitate electronic data communications between planning tool 902 and various external systems or devices (e.g., client device 922, results database 928, plan information database 926, etc.). For example, planning tool 902 may receive planned loads and utility rates from client device 922 and/or plan information database 926 via communications interface 904. Planning tool 902 may use communications interface 904 to output results of the simulation to client device 922 and/or to store the results in results database 928.

Still referring to FIG. 9, processing circuit 906 is shown to include a processor 910 and memory 912. Processor 910 may be a general purpose or specific purpose processor, an application specific integrated circuit (ASIC), one or more field programmable gate arrays (FPGAs), a group of processing components, or other suitable processing components. Processor 910 may be configured to execute computer code or instructions stored in memory 912 or received from other computer readable media (e.g., CDROM, network storage, a remote server, etc.).

Memory 912 may include one or more devices (e.g., memory units, memory devices, storage devices, etc.) for storing data and/or computer code for completing and/or facilitating the various processes described in the present disclosure. Memory 912 may include random access memory (RAM), read-only memory (ROM), hard drive storage, temporary storage, non-volatile memory, flash memory, optical memory, or any other suitable memory for storing software objects and/or computer instructions. Memory 912 may include database components, object code components, script components, or any other type of information structure for supporting the various activities and information structures described in the present disclosure. Memory 912 may be communicably connected to processor 910 via processing circuit 906 and may include computer code for executing (e.g., by processor 910) one or more processes described herein.

Still referring to FIG. 9, memory 912 is shown to include a GUI engine 916, web services 914, and configuration tools 918. In an exemplary embodiment, GUI engine 916 includes a graphical user interface component configured to provide graphical user interfaces to a user for selecting or defining plan information for the simulation (e.g., planned loads, utility rates, environmental conditions, etc.). Web services 914 may allow a user to interact with planning tool 902 via a web portal and/or from a remote system or device (e.g., an enterprise control application).

Configuration tools 918 can allow a user to define (e.g., via graphical user interfaces, via prompt-driven "wizards," etc.) various parameters of the simulation such as the number and type of subplants, the devices within each subplant, the subplant curves, device-specific efficiency curves, the duration of the simulation, the duration of the prediction window, the duration of each time step, and/or various other types of plan information related to the simulation. Configuration tools 918 can present user interfaces for building the simulation. The user interfaces may allow users to define simulation parameters graphically. In some embodiments, the user interfaces allow a user to select a pre-stored or pre-constructed simulated plant and/or plan information (e.g., from plan information database 926) and adapt it or enable it for use in the simulation.

Still referring to FIG. 9, memory 912 is shown to include optimizer 930. Optimizer 930 may use the planned loads and utility rates to determine an optimal resource allocation over a prediction window. With each iteration of the optimization process, optimizer 930 may shift the prediction window forward and apply the optimal resource allocation for the portion of the simulation period no longer in the prediction window. Optimizer 930 may use the new plan information at the end of the prediction window to perform the next iteration of the optimization process. Optimizer 930 may output the applied resource allocation to reporting applications 936 for presentation to a client device 922 (e.g., via user interface 924) or storage in results database 928.

Still referring to FIG. 9, memory 912 is shown to include reporting applications 936. Reporting applications 936 may receive the optimized resource allocations from optimizer 930 and, in some embodiments, costs associated with the optimized resource allocations. Reporting applications 936 may include a web-based reporting application with several graphical user interface (GUI) elements (e.g., widgets, dashboard controls, windows, etc.) for displaying key performance indicators (KPI) or other information to users of a GUI. In addition, the GUI elements may summarize relative energy use and intensity across various plants, subplants, or the like. Other GUI elements or reports may be generated and shown based on available data that allow users to assess the results of the simulation. The user interface or report (or underlying data engine) may be configured to aggregate and categorize resource allocation and the costs associated therewith and provide the results to a user via a GUI. The GUI elements may include charts or histograms that allow the user to visually analyze the results of the simulation.

Referring now to FIG. 10, a block diagram illustrating asset sizing module 1005 in greater detail is shown, according to an exemplary embodiment. Asset sizing module 1005 can be configured to determine the optimal sizes of various assets in a building, group of buildings, or a central plant. As described above, assets can include individual pieces of equipment (e.g., boilers, chillers, heat recovery chillers, steam generators, electrical generators, thermal energy storage tanks, batteries, etc.), groups of equipment, or entire subplants of a central plant. Asset sizes can include a maximum loading of the asset (e.g., maximum power, maximum charge/discharge rate) and/or a maximum capacity of the asset (e.g., maximum stored electric energy, maximum fluid storage, etc.).

In some embodiments, asset sizing module 1005 includes a user interface generator 1006. User interface generator 1006 can be configured to generate a user interface for interacting with asset sizing module 1005. The user interface may be provided to a user device 1002 (e.g., a computer workstation, a laptop, a tablet, a smartphone, etc.) and presented via a local display of user device 1002. In some embodiments, the user interface prompts a user to select one or more assets or types of assets to be sized. The selected assets can include assets currently in a building or central plant (e.g., existing assets the user is considering upgrading or replacing) or new assets not currently in the building or central plant (e.g., new assets the user is considering purchasing). For example, if the user is considering adding thermal energy storage or electrical energy storage to a building or central plant, the user may select "thermal energy storage" or "battery" from a list of potential assets to size/evaluate. User interface generator 1006 can identify any assets selected via the user interface and provide an indication of the selected assets to asset cost term generator 1008.

Asset cost term generator 1008 can be configured to generate one or more cost terms representing the purchase costs of the assets being sized. In some embodiments, asset cost term generator 1008 generates the following two asset cost terms:

$$c_f^T v + c_s^T s_a$$

where $c_f$ is a vector of fixed costs of buying any size of asset (e.g., one element for each potential asset purchase), v is a vector of binary decision variables that indicate whether the corresponding assets are purchased, $c_s$ is a vector of marginal costs per unit of asset size (e.g., cost per unit loading, cost per unit capacity), and $s_a$ is a vector of continuous decision variables corresponding to the asset sizes. Advantageously, the binary purchase decisions in vector v and asset size decisions in vector $s_a$ can be treated as decision variables to be optimized along with other decision variables x in the augmented cost function 1025 (cost function $J_a(x)$), described in greater detail below.

It should be noted that the values of the binary decision variables in vector v and the continuous decision variables in vector $s_a$ indicate potential asset purchases and asset sizes which can be evaluated by asset sizing module 1005 to determine whether such purchases/sizes optimize a given financial metric. The values of these decision variables can be adjusted by asset sizing module 1005 as part of an optimization process and do not necessarily reflect actual purchases or a current set of assets installed in a building, set of buildings, or central plant. Throughout this disclosure, asset sizing module 1005 is described as "purchasing" various assets or asset sizes. However, it should be understood that these purchases are merely hypothetical. For example, asset sizing module 1005 can "purchase" an asset by setting the binary decision variable $v_j$ for the asset to a value of $v_j=1$. This indicates that the asset is considered purchased within a particular hypothetical scenario and the cost of the asset is included in the augmented cost function $J_a(x)$. Similarly, asset sizing module 1005 can choose to not purchase an asset by setting the binary decision variable $v_j$ for the asset to a value of $v_j=0$. This indicates that the asset is considered not purchased within a particular hypothetical scenario and the cost of the asset is not included in the augmented cost function $J_a(x)$.

The additional cost terms $c_f^T v$ and $c_s^T s_a$ can be used to account for the purchase costs of any number of new assets. For example, if only a single asset is being sized, the vector $c_f$ may include a single fixed cost (i.e., the fixed cost of buying any size of the asset being considered) and v may include a single binary decision variable indicating whether the asset is purchased or not purchased (i.e., whether the fixed cost is incurred). The vector $c_s$ may include a single marginal cost element and $s_a$ may include a single continuous decision variable indicating the size of the asset to purchase. If the asset has both a maximum loading and a maximum capacity (i.e., the asset is a storage asset), the vector $c_s$ may include a first marginal cost per unit loading and a second marginal cost per unit capacity. Similarly, the vector $s_a$ may include a first continuous decision variable indicating the maximum loading size to purchase and a second continuous decision variable indicating the maximum capacity size to purchase.

If multiple assets are being sized, the vectors $c_f$, v, $c_s$, and $s_a$ may include elements for each asset. For example, the vector $c_f$ may include a fixed purchase cost for each asset being sized and v may include a binary decision variable indicating whether each asset is purchased. The vector $c_s$ may include a marginal cost element for each asset being considered and $s_a$ may include a continuous decision variable indicating the size of each asset to purchase. For any asset that has both a maximum loading and a maximum capacity, the vector $c_s$ may include multiple marginal cost elements (e.g., a marginal cost per unit loading size and a marginal cost per unit capacity size) and the vector $s_a$ may include multiple continuous decision variables (e.g., a maximum loading size to purchase and a maximum capacity size to purchase). By accounting for the purchase costs of multiple assets in terms of their respective sizes, the cost terms $c_f^T v$ and $c_s^T s_a$ allow high level optimizer 932 to optimize multiple asset sizes concurrently.

Still referring to FIG. 10, asset sizing module 1005 is shown to include a constraints generator 1010. Constraints generator 1010 can be configured to generate or update the constraints on the optimization problem. As discussed above, the constraints prevent high level optimizer 932 from allocating a load to an asset that exceeds the asset's maximum loading. For example, the constraints may prevent high level optimizer 932 from allocating a cooling load to a chiller that exceeds the chiller's maximum cooling load or assigning a power setpoint to a battery that exceeds the battery's maximum charge/discharge rate. The constraints may also prevent high level optimizer 932 from allocating resources in a way that causes a storage asset to exceed its maximum capacity or deplete below its minimum capacity. For example, the constraints may prevent high level optimizer 932 from charging a battery or thermal energy storage tank above its maximum capacity or discharging below its minimum stored electric energy (e.g., below zero).

When asset sizes are fixed, the loading constraints can be written as follows:

$$x_{j,i,load} \leq x_{j,load_{max}} \quad \begin{array}{l} \forall j = 1 \ldots N_a \\ \forall i = k \ldots k+h-1 \end{array}$$

where $x_{j,i,load}$ is the load on asset j at time step i over the horizon, $x_{j,load_{max}}$ is the fixed maximum load of the asset j, and $N_a$ is the total number of assets. Similarly, the capacity constraints can be written as follows:

$$0 \leq x_{j,i,cap} \leq x_{j,cap_{max}} \quad \begin{array}{l} \forall j = 1 \ldots N_a \\ \forall i = k \ldots k+h-1 \end{array}$$

where $x_{j,i,cap}$ is the capacity of asset j at time step i over the horizon and $x_{j,cap_{max}}$ is the fixed maximum capacity of the asset j. However, these constraints assume that the maximum load $x_{j,load_{max}}$ and maximum capacity $x_{j,cap_{max}}$ of an asset is fixed. When asset sizes are treated as optimization variables, the maximum load and capacity of an asset may be a function of the asset size purchased in the optimization problem (i.e., the size of the asset defined by the values of the binary and continuous decision variables in vectors v and $s_a$).

Constraints generator 1010 can be configured to update the loading constraints to accommodate a variable maximum loading for each asset being sized. In some embodiments, constraints generator 1010 updates the loading constraints to limit the maximum load of an asset to be less than or equal to the total size of the asset purchased in the optimization problem. For example, constraints generator 1010 can translate the loading constraints into the following:

$$\begin{array}{l} x_{j,i,load} \leq s_{a_{j,load}} \\ s_{a_{j,load}} \leq M_j v_j \end{array} \quad \forall j = 1 \ldots N_a$$

$s_{a_{j,load}}$ where s is the loading size of asset j (i.e., the jth load size element of the continuous variable vector $s_a$), $v_j$ is the binary decision variable indicating whether asset j is purchased (i.e., the jth element of the binary variable vector v), and $M_j$ is a sufficiently large number. In some embodiments, the number $M_j$ is set to the largest size of asset j that can be purchased. The first inequality in this set of constraints ensures that the load on an asset $x_{j,i,load}$ is not greater than the size of the asset $s_{a_{j,load}}$ that is purchased. The second inequality forces the optimization to pay for the fixed cost of an asset before increasing the load size of the asset. In other words, asset j must be purchased (i.e., $v_j=1$) before the load size $s_{a_{j,load}}$ of asset j can be increased to a non-zero value.

Similarly, constraints generator 1010 can be configured to update the capacity constraints to accommodate a variable maximum capacity for each storage asset being sized. In some embodiments, constraints generator 1010 updates the capacity constraints to limit the capacity of an asset between zero and the total capacity of the asset purchased in the optimization problem. For example, constraints generator 1010 can translate the capacity constraints into the following:

$$\begin{array}{l} 0 \leq x_{j,i,cap} \leq s_{a_{j,cap}} \\ s_{a_{j,cap}} \leq M_j v_j \end{array} \quad \forall j = 1 \ldots N_a$$

where $s_{a_{j,cap}}$ is the capacity size of asset j (i.e., the jth capacity size element of the continuous variable vector $s_a$), $v_j$ is the binary decision variable indicating whether asset j is purchased (i.e., the jth element of the binary variable vector v), and $M_j$ is a sufficiently large number. In some embodiments, the number $M_j$ is set to the largest size of asset j that can be purchased. The first inequality in this set of constraints ensures that the capacity of an asset $x_{j,i,cap}$ at any time step i is between zero and the capacity size of the asset $s_{a_{j,cap}}$ that is purchased. The second inequality forces the optimization to pay for the fixed cost of an asset before increasing the capacity size of the asset. In other words, asset j must be purchased (i.e., $v_j=1$) before the capacity size $s_{a_{j,cap}}$ of asset j can be increased to a non-zero value.

The constraints generated or updated by constraints generator 1010 may be imposed on the optimization problem along with the other constraints generated by high level optimizer 932. In some embodiments, the loading constraints generated by constraints generator 1010 replace the power constraints generated by high level optimizer 932. Similarly, the capacity constraints generated by constraints generator 1010 may replace the capacity constraints generated by high level optimizer 932. However, the asset loading constraints and capacity constraints generated by constraints generator 1010 may be imposed in combination with the switching constraints generated by high level optimizer 932, the demand charge constraints generated by high level optimizer 932, and any other constraints imposed by high level optimizer 932.

Still referring to FIG. 10, asset sizing module 1005 is shown to include a scaling factor generator 1012. The cost of purchasing an asset is typically paid over the duration of a payback period, referred to herein as a simple payback period (SPP). However, the original cost function J(x) may only capture operational costs and benefits over the optimization period h, which is often much shorter than the SPP. In order to combine the asset purchase costs $c_f^T v$ and $c_s^T s_a$ with the original cost function J(x), it may be necessary to place the costs on the same time scale.

In some embodiments, scaling factor generator 1012 generates a scaling factor for the asset cost terms $c_f^T v$ and $c_s^T s_a$. The scaling factor can be used to scale the asset purchase costs $c_f^T v$ and $c_s^T s_a$ to the duration of the optimization period h. For example, scaling factor generator 1012 can multiply the terms $c_f^T v$ and $c_s^T s_a$ by the ratio $$\frac{h}{SPP}$$

as shown in the following equation:

$$C_{scaled} = \frac{h}{8760 \cdot SPP}\left(c_f^T v + c_s^T s_a\right)$$

where $C_{scaled}$ is the purchase cost of the assets scaled to the optimization period, h is the duration of the optimization period in hours, SPP is the duration of the payback period in years, and 8760 is the number of hours in a year.

In other embodiments, scaling factor generator 1012 generates a scaling factor for the original cost function J(x). The scaling factor can be used to extrapolate the original cost function J(x) to the duration of the simple payback period SPP. For example, scaling factor generator 1012 can multiply the original cost function J(x) by the ratio $$\frac{SPP}{h}$$

as shown in the following equation:

$$J(x)_{scaled} = \frac{8760 \cdot SPP}{h} J(x)$$

where $J(x)_{scaled}$ is the scaled cost function extrapolated to the duration of the simple payback period SPP, h is the duration of the optimization period in hours, SPP is the duration of the payback period in years, and 8760 is the number of hours in a year.

Still referring to FIG. 10, asset sizing module 1005 is shown to include a cost function augmenter 1014. Cost function augmenter 1014 can be configured to augment the original cost function J(x) with the scaled purchase cost of the assets $C_{scaled}$. The result is an augmented cost function $J_a(x)$ as shown in the following equation:

$$J_a(x) = J(x) + \frac{h}{8760 \cdot SPP}\left(c_f^T v + c_s^T s_a\right)$$

where h is the duration of the optimization period in hours, SPP is the duration of the payback period in years, and 8760 is the number of hours in a year.

High level optimizer 932 can perform an optimization process to determine the optimal values of each of the binary decision variables in the vector v and each of the continuous decision variables in the vector $s_a$. In some embodiments, high level optimizer 932 uses linear programming (LP) or mixed integer linear programming (MILP) to optimize a financial metric such as net present value (NPV), simple payback period (SPP), or internal rate of return (IRR). Each element of the vectors $c_f$, v, $c_s$, and $s_a$ may correspond to a particular asset and/or a particular asset size. Accordingly, high level optimizer 932 can determine the optimal assets to purchase and the optimal sizes to purchase by identifying the optimal values of the binary decision variables in the vector v and the continuous decision variables in the vector $s_a$.

Still referring to FIG. 10, asset sizing module 1005 is shown to include a benefit curve generator 1016. Benefit curve generator 1016 can be configured to generate a benefit curve based on the augmented cost function $J_a(x)$. In some embodiments, the benefit curve indicates the relationship between the initial investment cost $C_0$ of an asset (i.e., the cost of purchasing the asset) and the annual benefit C derived from the asset. For example, the benefit curve may express the initial investment cost $C_0$ as a function of the annual benefit C, as shown in the following equation:

$$C_0 = f(C)$$

where both the initial investment cost $C_0$ and the annual benefit C are functions of the asset size. Several examples of benefit curves which can be generated by benefit curve generator 1016 are shown in FIGS. 12-15 (discussed in greater detail below).

In some embodiments, the initial investment cost $C_0$ is the term $c_f^T v + c_s^T s_a$ in the augmented cost function $J_a(x)$. The benefit of an asset over the optimization horizon h may correspond to the term J(x) in the augmented cost function $J_a(x)$ and may be represented by the variable $C_h$. In some embodiments, the variable $C_h$ represents the difference between a first value of J(x) when the asset is not included in the optimization and a second value of J(x) when the asset is included in the optimization. The annual benefit C can be found by extrapolating the benefit over the horizon $C_h$ to a full year. For example, the benefit over the horizon $C_h$ can be scaled to a full year as shown in the following equation:

$$C = \frac{8760}{h} C_h$$

where h is the duration of the optimization horizon in hours and 8760 is the number of hours in a year.

Increasing the size of an asset increases both its initial cost $C_0$ and the annual benefit C derived from the asset. However, the benefit C of an asset will diminish beyond a certain asset size or initial asset cost $C_0$. In other words, choosing an asset with a larger size will not yield any increased benefit. The benefit curve indicates the relationship between $C_0$ and C and can be used to find the asset size that optimizes a given financial metric (e.g., SPP, NPV, IRR, etc.). Several examples of such an optimization are described in detail below. In some embodiments, benefit curve generator 1016 provides the benefit curve to financial metric optimizer 1020 for use in optimizing a financial metric.

Still referring to FIG. 10, asset sizing module 1005 is shown to include a financial metric optimizer 1020. Financial metric optimizer 1020 can be configured to find an asset size that optimizes a given financial metric. The financial metric may be net present value (NPV), internal rate of return (IRR), simple payback period (SPP), or any other financial metric which can be optimized as a function of asset size. In some embodiments, the financial metric to be optimized is selected by a user. For example, the user interface generated by user interface generator 1006 may prompt the user to select the financial metric to be optimized. In other embodiments, asset sizing module 1005 may automatically determine the financial metric to be optimized or may optimize multiple financial metrics concurrently (e.g., running parallel optimization processes).

The analyzer 408 can determine, using at least one of facility data 312, utility access data 316 and/or operational data 616, at least one baseline value for at least one sustainability parameter. The analyzer 408 can provide, to the triage and planning system 302, the baseline values that pertain to the sustainability parameters. The triage and planning system 302 can provide, to the user device 318, the baseline values that pertain to the sustainability parameters. The triage and planning system 302 providing, to the user device 318, the baseline values that pertain to the sustainability parameters can cause the user device 318 to display, via a user interface, an element. The element can include the baseline values that pertain to the sustainability parameters.

The operator of the user device 318 can interact with the element. For example, the operator of the user device 318 can enter, provide, select or otherwise supply at least one user defined sustainability goal. The user defined sustainability goal can be the sustainability goals 314. The sustainability goal 314 can pertain to at least one of the sustainability parameters described herein. The triage and planning system 302 can provide, to the demand side data system 308, the sustainability goals 314. The demand side data system 308 can, using the sustainability goals 314, generate at least one sustainability report. The sustainability report can include at least one recommendation that can meet the sustainability goals 314. The demand side data system 308 can provide, to the triage and planning system 302, the sustainability report. The triage and planning system 302 can, responsive to receiving the sustainability report, provide signals to the user device 318 that cause the user interface to update the element to include the sustainability report.

The analyzer 408 can identify, using at least one of facility data 312, utility access data 316 and/or any other possible data stored in data storage 324, at least one asset that contributes to at least one sustainability parameter. The analyzer 408 can determine, using data that pertains to the assets, a contribution factor for the assets. The contribution factor can indicate a contribution of the assets in relation to the sustainability parameters. For example, a contribution factor can be that boiler 17 contributes 17 percent of the total carbon emissions for a building (e.g., building 10). The analyzer 408 can, using the contribution factor for the assets and a predetermined contribution factor index, a benchmark index for the assets. The benchmark index can be at least one of a peer ranking of the building 10 and/or the assets to a building and/or assets that are a similar size (square footage, capacity, output, etc.), a similar age, a similar geographic location, etc.

The sustainability tracker 808 can detect a change in at least one sustainability parameter. The sustainability tracker 808 compare the detected change in the sustainability parameters to at least one sustainability goal that pertains to the sustainability parameters. The sustainability tracker can determine, responsive to comparing the detected change in the sustainability parameters to the sustainability goals that pertains to the sustainability parameters, that the change is noncompliant. For example, the sustainability tracker 808 can determine that the detected change in the sustainability parameters indicates that the carbon emissions of the building has increased. The carbon emissions increasing can be noncompliant responsive to the sustainability goal being a goal to reduce carbon emissions.

The sustainability tracker 808 can, responsive to determining that the detected change in the sustainability parameter is noncompliant, can communicate with the sustainability planner 806. The sustainability planner 806 can, responsive to communicating with the sustainability tracker 808, update the sustainability report, generated by the demand side data system 308, to include at least one recommendation that can address the change in the sustainability parameter.

Figure 11:
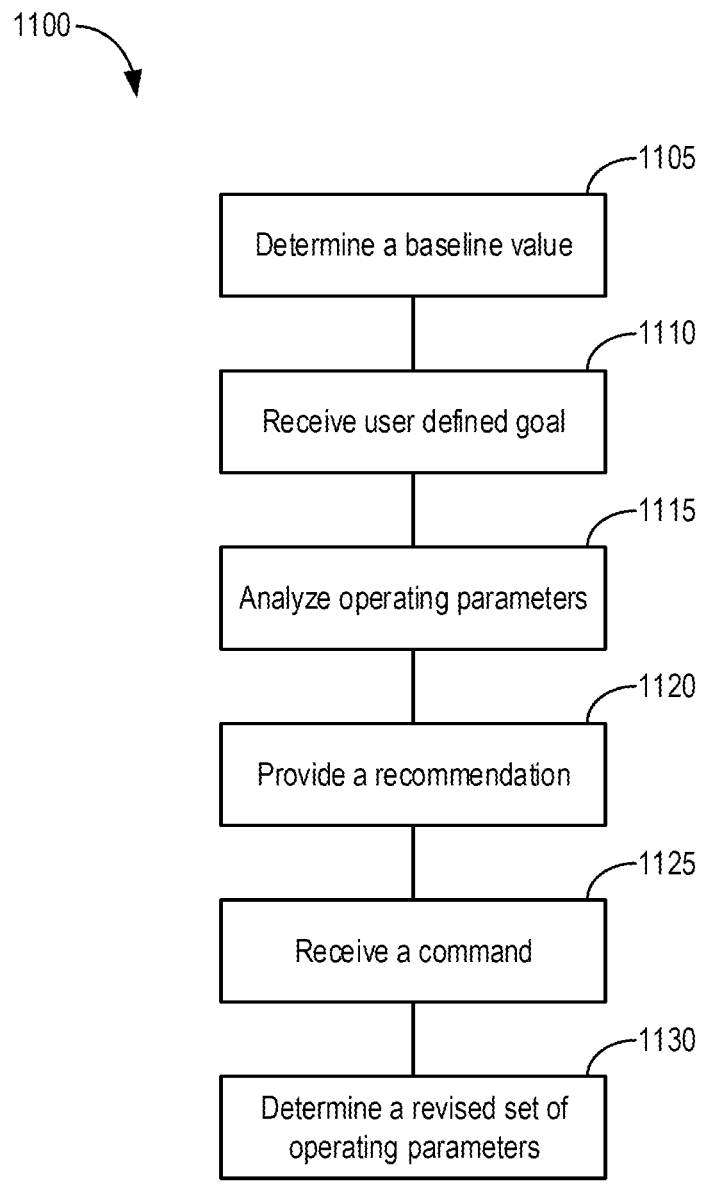
FIG. 11 is a flow diagram of process for improving sustainability of a building, according to an exemplary embodiment.

The user portal 802 can cause the user device 318 to display, via a user interface, the updated sustainability report. The user portal 802 can receive, from the user device 318, an indication to accept the recommendation that was included in the updated sustainability report. The user portal 802 can, responsive to receiving the indication to accept the recommendation, can provide, to the system 300 and/or a component thereof, the indication to accept the recommendation. The system 300 can, in response to receiving the indication to accept the recommendation, execute the recommendation. The system 300 executing the recommendation can address the detected change in the sustainability parameter. For example, the executed recommendation can cause operational changes to at least one piece of building equipment and the operational changes can address the detected change in the sustainability parameter, Referring now to FIG. 11 a flow diagram of process 1100 for improving the sustainability of a building is shown, according to an embodiment. At least one step of the process 1100 can be performed by the system 300 and/or a component thereof. For example, the optimization 322 can perform at least one step of the process 1100. At least one step of the process 1100 can be performed by the system 900 and/or a component thereof. For example, the optimizer 930 can perform at least one step of the process 1100.

In step 1105, at least one baseline value is determined. The baseline value can pertain to at least one sustainability parameter. The sustainability parameters can be at least one of carbon emissions, energy consumption, water consumption, waste production, gas consumption, solar power consumption or wind turbine electric consumption. The sustainability parameters can pertain to at least one building. For example, the sustainability parameters can pertain to the building 10.

The analyzer 408 can determine a baseline value for the sustainability parameters that pertain to the building 10. For example, the analyzer 408 can determine a carbon emissions baseline for the building 10. The analyzer can use the utility access data 316 and/or the facility data 312 to determine the baseline value for the carbon emissions of the building 10. The baseline value can indicate at least one of an initial value that can be used to established goals, a benchmark ranking, a starting point which can be used to establish trends and/or a contribution factor towards the building 10 total emissions. The analyzer 408 can provide the baseline values that pertain to the sustainability parameters of the building 10 to a user device (e.g., the user device 318).

The user device 318 can receive, from the analyzer 408, the baseline values that pertain to the sustainability parameters of the building 10. The analyzer 408 can cause, responsive to the user device 318 receiving the baseline values that pertain to the sustainability parameters of the building 10, the user device 318 to display, via a user interface, at least one of the baseline values for the sustainability parameters that pertain to the building 10. The operator of the user device 318 can view, see, interact with, interface with or otherwise engage with the user interface that is displaying the baseline values that pertain to the sustainability parameters of the building 10.

In step 1110, at least one user defined goal is received. The user defined goal can be a sustainability goal that pertains to at least one of the sustainability parameters of the building 10. For example, the sustainability goal can be a goal to reduce carbon emissions (e.g., sustainability parameter) by at least one of a certain percentage, a certain value, achieve net-zero by a certain date (e.g., a certain day, month, year, decade, etc.) or any other possible goal that can pertain to the sustainability of the building 10.

The triage and planning system 302 can receive, from the user device 318, at least one user defined sustainability goal (e.g., the sustainability goals 314). The triage and planning system 302 can, responsive to receiving the sustainability goals 314, provide, to the demand side data system 308, the sustainability goals 314. The demand side data system 308 can, responsive to receiving the sustainability goals 314, identify at least one sustainability parameter that pertains to the sustainability goals 314. The demand side data system 308 can identify at least one piece of building equipment that pertains to the sustainability parameters.

In step 1115, at least one operating parameter is analyzed. The operating parameters can be at least one of control strategies that pertain to at least one piece of building equipment, operating setpoints, building equipment or building system runtime, building system settings and or maintenance routines. The operating parameters can be or include at least one of the data 604-608 and/or the operational data 616.

The demand side analyzer 610 can analyze at least one operating parameter that pertains to the building 10 and/or at least one piece of building equipment that pertains to the building 10. For example, the demand side analyzer 610 can analyze, using operational data 616, equipment runtime. The demand side analyzer 610 can determine at least one of how frequently the pieces of building equipment operate (e.g., run), how long the pieces of building equipment operate for (e.g., a run cycle) or any other possible runtime determination.

The demand side analyzer 610 can, responsive to analyzing the operating parameters that pertain to the building 10 and/or the pieces of building equipment, generate at least one recommendation. The recommendation can be at least one of a FIM, operational improvements (e.g., adjustments to at least one operating parameter), building equipment maintenance routines and/or incentive programs.

In step 1120, at least one recommendation is provided. The recommendations can be provided to a user device (e.g., the user device 318). The recommendations can be the recommendations generated in step 1115. The triage and planning system 302 can provide the recommendations to the user device 318. The triage and planning system 302 providing the recommendations to the user device 318 can cause the user device 318, via a user interface, to display the recommendations. The user interface can include the recommendations and one or more changes that can implement the recommendations. The operator of the user device 318 can engage with, interact with or otherwise interface with at least a portion of the user interface. For example, the operator of the user device 318 can select an icon that corresponds to at least one recommendation.

In step 1125, at least one command is received. The command can correspond to the recommendation that was selected by the operator of the user device 318 in step 1120. The command can implement one or more changes to the operating parameters of the building 10 and/or the pieces of building equipment that pertain to the building 10. The command can include at least one operational improvement that was generated in step 1115.

In step 1130, at least one set of operating parameters are revised. The operating parameters can be revised for at least one piece of building equipment that pertains to the building 10. The operating parameters can be revised to correspond with the operational improvements that were included in the command in step 1125. Control signals can be, responsive to the revising the operating parameters, provided to the pieces of building equipment that pertain to the revised set of operation parameters. The control signals can cause at least one of operational changes to the pieces of building equipment, parameter adjustments to the pieces of building equipment and/or adjust in at least one sustainability parameter that pertains to the pieces of building equipment. The control signals can be similar to the control signals described in relation to the system 200.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building system for improving sustainability of a building, the building including a plurality of pieces of building equipment that control one or more environmental conditions of the building based on operational settings, the building system including one or more storage devices storing instructions thereon that, when executed by one or more processors, cause the one or more processors to:
   determine, using data that pertains to at least one of the building or the plurality of pieces of building equipment, a plurality of baseline values for a plurality of sustainability parameters associated with the building;
   receive a user defined sustainability goal for at least a subset of the plurality of sustainability parameters;
   analyze operating parameters of at least a portion of the plurality of pieces of building equipment to identify historical operations of the plurality of pieces of building equipment;
   determine, using the historical operations, one or more changes to the operating parameters predicted to fulfill the user defined sustainability goal alone or in combination with one or more other changes to the building;
   provide one or more recommendations which (i) identify the one or more changes to the operating parameters and (ii) indicate one or more pieces of building equipment of the plurality of pieces of building equipment that correspond to respective changes of the one or more changes to the operating parameters;
   receive a command to implement, for at least a first piece of building equipment of the plurality of pieces of building equipment, at least one change of the one or more changes to the operating parameters;
   determine, based at least on the at least one change, a revised set of operating parameters for at least the first piece of building equipment of the plurality of pieces of building equipment responsive to the command to implement the at least one change; and
   transmit, to at least the first piece of building equipment, a control signal causing at least the first piece of building equipment to implement the revised set of operating parameters.

2. The building system of claim 1, wherein the instructions cause the one or more processors to:
   transmit, to at least the first piece of building equipment of the plurality of pieces of building equipment, a control signal, wherein the control signal causes the revised set of operating parameters for at least the first piece of building equipment to be implemented;
   detect, responsive to transmittal of the control signal, a change in at least a first sustainability parameter of the plurality of sustainability parameters associated with the building, wherein the change indicates an improvement in the user defined sustainability goal; and
   determine that the change in at least the first sustainability parameter of the plurality of sustainability parameters reflects implementation of the revised set of operating parameters by at least the first piece of building equipment of the plurality of pieces of building equipment.

3. The building system of claim 1, wherein the instructions cause the one or more processors to:
   detect a change in a sustainability parameter of the plurality of sustainability parameters;
   update, responsive to determination that the change in the sustainability parameter indicates that a sustainability goal for the sustainability parameter is noncompliant, the one or more recommendations to include a new recommendation to address the change in the sustainability parameter; and
   execute, responsive to receipt of an indication to accept the new recommendation, the new recommendation, wherein execution of the new recommendation causes one or more control signals to be transmitted to at least one piece of building equipment the one or more pieces of building equipment of the plurality of pieces of building equipment and the one or more control signals to adjust operational parameters of the one or more pieces of building equipment. at least one piece of building equipment of the plurality of pieces of building equipment.

4. The building system of claim 1, wherein the instructions cause the one or more processors to:
   determine, for an action that pertains to at least one piece of building equipment of the plurality of pieces of building equipment, a predicted impact on a sustainability parameter of the plurality of sustainability parameters;
   compare the predicted impact with the user defined sustainability goal; and
   prevent, in response to determining that the predicted impact violates a sustainability goal for the sustainability parameter, the action from occurring.

5. The building system of claim 1, wherein the instructions cause the one or more processors to:
   determine, using the data that pertains to the plurality of pieces of building equipment, a plurality of building systems that pertain to the plurality of pieces of building equipment;
   generate, using the data that pertains to the plurality of building systems, a contribution factor for at least one building system of the plurality of building systems;
   generate, using the contribution factor for the at least one building system of the plurality of building systems, a recommendation that addresses the contribution factor of the at least one building system of the plurality of building systems, wherein the recommendation includes a plurality of changes to operational parameters of one or more first pieces of building equipment included in the building system; and
   execute the recommendation causing changes to the operational parameters of the one or more first pieces of building equipment included in the building system.

6. The building system of claim 1, wherein the instructions cause the one or more processors to:
   receive, from a user device, a selection of a recommendation from the one or more recommendations;
   determine, using the recommendation, a piece of building equipment of the plurality of pieces of building equipment that pertains to the recommendation;
   execute the recommendation causing changes to operational parameters of the piece of building equipment; and
   detect a change in a sustainability parameter of the plurality of sustainability parameters responsive to changing the operational parameters of the piece of building equipment.

7. The building system of claim 1, wherein the instructions cause the one or more processors to:
   detect, using the data that pertains to the building, a new piece of building equipment;

associate the new piece of building equipment with a sustainability parameter of the plurality of sustainability parameters; and generate, in response to associating the new piece of building equipment with the sustainability parameter, a recommendation that addresses a sustainability goal of the sustainability parameter, wherein the recommendation includes one or more actions, executable by the new piece of building equipment, that meet the sustainability goal of the sustainability parameter.

8. The building system of claim 1, wherein the instructions cause the one or more processors to:

determine, using data that pertains to at least one the building or the plurality of pieces of building equipment, a contribution factor for a piece of building equipment of the plurality of pieces of building equipment, wherein the contribution factor indicates contribution of the piece of building equipment in relation to a sustainability parameter of the plurality of sustainability parameters; and determine, using the contribution factor for the piece of building equipment and a predetermined contribution factor index, a benchmark index for the piece of building equipment.

9. The building system of claim 1, wherein the instructions cause the one or more processors to:

cause a user device to display, via a user interface, a prompt to select, from the plurality of pieces of building equipment or a plurality of building equipment types that pertain to the plurality of pieces of building equipment, a piece of building equipment or a building equipment type to be sized;

identify the piece of building equipment or the building equipment type selected from the plurality of pieces of building equipment or the plurality of building equipment types; and determine, using the data that pertains to the building, a size for the piece of building equipment or the building equipment type, wherein the size optimizes at least one of a load for the piece of building equipment or the building equipment type, a capacity for the piece of building equipment or the building equipment type or a cost associated with the piece of building equipment or the building equipment type.

10. The building system of claim 1, wherein the instructions cause the one or more processors to:

detect, using the data that pertains to the building, a change in a sustainability parameter of the plurality of sustainability parameters;

determine, using the change in the sustainability parameter, a trend associated with the sustainability parameter, wherein the trend indicates progress made towards a sustainability goal for the sustainability parameter; and cause a user device to display, via a user interface, a graphical representation of the trend, wherein the graphical representation of the trend includes at least one of a baseline value for the sustainability parameter, a current value for the sustainability parameter, a difference between the baseline value and the current value or the sustainability goal that relates to the sustainability parameter.

11. The building system of claim 1, wherein the plurality of sustainability parameters include at least one of:

carbon emissions;
energy consumption;
water consumption;
waste production;
gas consumption;
solar power consumption; or
wind turbine electric consumption.

12. A method for improving sustainability of a building, comprising:

determining, by one or more processing circuits, using data that pertains to at least one of the building or a plurality of pieces of building equipment, a plurality of baseline values for a plurality of sustainability parameters associated with the building;

receiving, by the one or more processing circuits, a user defined sustainability goal for at least a subset of the plurality of sustainability parameters;

analyzing, by the one or more processing circuits, operating parameters of at least a portion of the plurality of pieces of building equipment to identify historical operations of the plurality of pieces of building equipment;

determining, by the one or more processing circuits, using the historical operations, one or more changes to the operating parameters predicted to fulfill the user defined sustainability goal alone or in combination with one or more other changes to the building;

providing, by the one or more processing circuits, one or more recommendations which (i) identify the one or more changes to the operating parameters and (ii) indicate one or more pieces of building equipment of the plurality of pieces of building equipment that correspond to respective changes of the one or more changes to the operating parameters;

receiving, by the one or more processing circuits, a command to implement, first at least a first piece of building equipment of the plurality of pieces of building equipment, at least one change of the one or more changes to the operating parameters;

determining, by the one or more processing circuits, based at least on the at least one change, a revised set of operating parameters for at least the first piece of building equipment of the plurality of pieces of building equipment responsive to the command to implement the at least one change; and transmitting, by the one or more processing circuits, a control signal causing at least the first piece of building equipment to implement the revised set of operating parameters.

13. The method of claim 12, comprising:

transmitting, by the one or more processing circuits, to at least the first piece of building equipment of the plurality of pieces of building equipment, a control signal, wherein the control signal causes the revised set of operating parameters for at least the first piece of building equipment to be implemented;

detecting, by the one or more processing circuits, responsive to transmitting the control signal, a change in at least a first sustainability parameter of the plurality of sustainability parameters associated with the building, wherein the change indicates an improvement in the user defined sustainability goal; and determining, by the one or more processing circuits, that the change in at least the first sustainability parameter of the plurality of sustainability parameters reflects implementation of the revised set of operating parameters by at least the first piece of building equipment of the plurality of pieces of building equipment.

14. The method of claim 12, comprising:
   detecting, by the one or more processing circuits, a change in a sustainability parameter of the plurality of sustainability parameters;
   updating, by the one or more processing circuits, responsive to determining that the change in the sustainability parameter indicates that a sustainability goal for the sustainability parameter is noncompliant, the one or more recommendations to include a new recommendation to address the change in the sustainability parameter; and
   executing, by the one or more processing circuits, responsive to receiving an indication to accept the new recommendation, the new recommendation, wherein executing the new recommendation causes one or more control signals to be transmitted to at least one piece of building equipment the one or more pieces of building equipment of the plurality of pieces of building equipment and the one or more control signals to adjust operational parameters of the one or more pieces of building equipment. at least one piece of building equipment of the plurality of pieces of building equipment.

15. The method of claim 12, comprising:
   determining, by the one or more processing circuits circuit, for an action that pertains to at least one piece of building equipment of the plurality of pieces of building equipment, a predicted impact on a sustainability parameter of the plurality of sustainability parameters;
   comparing, by the one or more processing circuits, the predicted impact with the user defined sustainability goal; and
   preventing, by the one or more processing circuits, in response to determining that the predicted impact violates a sustainability goal for the sustainability parameter, the action from occurring.

16. The method of claim 12, comprising:
   determining, by the one or more processing circuits, using the data that pertains to the plurality of pieces of building equipment, a plurality of building systems that pertain to the plurality of pieces of building equipment;
   generating, by the one or more processing circuits, using the data that pertains to the plurality of building systems; a contribution factor for a building system of the plurality of building systems;
   generating, by the one or more processing circuits, using the contribution factor of the building system of the plurality of building systems, a recommendation that addresses the contribution factor of the building system of the plurality of building systems, wherein the recommendation includes a plurality of changes to operational parameters of one or more first pieces of building equipment included in the building system; and
   executing, by the one or more processing circuits, the recommendation causing changes to the operational parameters of the one or more first pieces of building equipment included in the building system.

17. The method of claim 12, comprising:
   receiving, by the one or more processing circuits, from a user device, a selection of a recommendation from the one or more recommendations;
   determining, by the one or more processing circuits, using the recommendation, a piece of building equipment of the plurality of pieces of building equipment that pertains to the recommendation;
   executing, by the one or more processing circuits, the recommendation causing changes to operational parameters of the piece of building equipment; and
   detecting, by the one or more processing circuits, a change in a sustainability parameter of the plurality of sustainability parameters responsive to changing the operational parameters of the piece of building equipment.

18. The method of claim 12, comprising:
   detecting, by the one or more processing circuits, using the data that pertains to the building, a new piece of building equipment;
   associating, by the one or more processing circuits, the new piece of building equipment with a sustainability parameter of the plurality of sustainability parameters; and
   generating, by the one or more processing circuits, in response to associating the new piece of building equipment with the sustainability parameter, a recommendation that addresses a sustainability goal of the sustainability parameter, wherein the recommendation includes one or more actions, executable by the new piece of building equipment, that meet the sustainability goal of the sustainability parameter.

19. A building system for improving sustainability of a building, the building including a plurality of pieces of building equipment that control one or more environmental conditions of the building based on operational settings, the building system including one or more computer-readable storage media having instructions stored thereon that, when executed by one or more processors, cause the one or more processors to implement operations comprising:
   determining, using data that pertains to at least one of the building or the plurality of pieces of building equipment, a plurality of baseline values for a plurality of sustainability parameters associated with the building;
   receiving a user defined sustainability goal for at least a subset of the plurality of sustainability parameters;
   analyzing operating parameters of at least a portion of the plurality of pieces of building equipment to identify historical operations of the plurality of pieces of building equipment;
   determining, using the historical operations, one or more changes to the operating parameters predicted to fulfill the user defined sustainability goal alone or in combination with one or more other changes to the building;
   providing one or more recommendations which (i) identify the one or more changes to the operating parameters and (ii) indicate one or more pieces of building equipment of the plurality of pieces of building equipment that correspond to respective changes of the one or more changes to the operating parameters;
   receiving a command to implement, for at least a first piece of building equipment of the plurality of pieces of building equipment, at least one change of the one or more changes to the operating parameters;
   determining, based at least on the at least one change, a revised set of operating parameters for at least the first piece of building equipment of the plurality of pieces of building equipment responsive to the command to implement the at least one change; and
   transmitting, to at least the first piece of building equipment, a control signal causing at least the first piece of building equipment to implement the revised set of operating parameters.

20. The building system of claim 19, wherein the instructions cause the one or more processors to implement operations comprising:
- transmitting, to at least the first piece of building equipment of the plurality of pieces of building equipment, a control signal, wherein the control signal causes the revised set of operating parameters for at least the first piece of building equipment to be implemented;
- detecting, responsive to transmitting the control signal, a change in at least a first sustainability parameter of the plurality of sustainability parameters associated with the building, wherein the change indicates an improvement in the user defined sustainability goal; and
- determining that the change in at least the first sustainability parameter of the plurality of sustainability parameters reflects implementation of the revised set of operating parameters by at least the first piece of building equipment of the plurality of pieces of building equipment.

* * * * *